(12) United States Patent
Watanabe et al.

(10) Patent No.: US 9,023,941 B2
(45) Date of Patent: *May 5, 2015

(54) URETHANE RESIN PARTICLES

(75) Inventors: Shinji Watanabe, Kyoto (JP); Yasuhiro Tsudo, Kyoto (JP); Masaki Inaba, Kyoto (JP); Jun Takeuchi, Kyoto (JP); Yuko Matsumoto, Kyoto (JP)

(73) Assignee: Sanyo Chemical Industries, Ltd., Kyoto-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/884,771

(22) PCT Filed: Nov. 9, 2011

(86) PCT No.: PCT/JP2011/006263
§ 371 (c)(1),
(2), (4) Date: May 10, 2013

(87) PCT Pub. No.: WO2012/063483
PCT Pub. Date: May 18, 2012

(65) Prior Publication Data
US 2013/0237664 A1 Sep. 12, 2013

(30) Foreign Application Priority Data

Nov. 12, 2010 (JP) ................. 2010-253674
Apr. 12, 2011 (JP) ................. 2011-088028
May 12, 2011 (JP) ................. 2011-107339

(51) Int. Cl.
| | | |
|---|---|---|
| C08G 18/83 | (2006.01) | |
| C08G 18/42 | (2006.01) | |
| C08K 5/092 | (2006.01) | |
| C08K 5/103 | (2006.01) | |
| C08G 18/80 | (2006.01) | |
| C08G 18/32 | (2006.01) | |
| C08L 75/06 | (2006.01) | |
| B29C 41/00 | (2006.01) | |
| B29C 41/18 | (2006.01) | |
| C08G 18/66 | (2006.01) | |
| C08G 18/73 | (2006.01) | |
| C08G 18/12 | (2006.01) | |
| C08G 18/28 | (2006.01) | |
| C08G 18/34 | (2006.01) | |
| C08K 5/04 | (2006.01) | |
| C08L 75/12 | (2006.01) | |
| B29K 75/00 | (2006.01) | |

(52) U.S. Cl.
CPC .............. *C08G 18/831* (2013.01); *C08G 18/42* (2013.01); *C08G 18/4208* (2013.01); *C08K 5/092* (2013.01); *C08K 5/103* (2013.01); *C08G 18/8064* (2013.01); *C08G 18/3215* (2013.01); *C08L 75/06* (2013.01); *B29C 41/003* (2013.01); *B29C 41/18* (2013.01); *B29K 2075/00* (2013.01); *C08G 18/6659* (2013.01); *C08G 18/73* (2013.01); *C08G 18/12* (2013.01); *C08G 18/2825* (2013.01); *C08G 18/345* (2013.01); *C08G 18/4202* (2013.01); *C08G 2140/00* (2013.01); *C08K 5/04* (2013.01); *C08L 75/12* (2013.01)

(58) Field of Classification Search
CPC .......... C08K 5/04; C08K 5/092; C08K 5/103; C08G 18/42; C08G 18/4208; C08G 18/3215; C08G 18/831; C08G 18/8064; C08G 18/12; C08G 18/2825; C08G 18/345; C08G 18/4202; C08G 18/6659; C08G 18/73; C08G 2140/00; C08L 75/06; C08L 75/12
USPC ............ 524/589, 590, 591, 839, 840; 528/44, 528/60, 61, 65, 66, 80, 81, 84, 85; 525/440.06
See application file for complete search history.

(56) References Cited

FOREIGN PATENT DOCUMENTS

| | | |
|---|---|---|
| JP | 10-259369 A | 9/1998 |
| JP | 2002-326241 A | 11/2002 |
| JP | 2005-263877 A | 9/2005 |
| JP | 2007-246673 A | 9/2007 |
| JP | 2007-246676 A | 9/2007 |
| JP | 2007-283865 A | 11/2007 |
| JP | 2008-101204 A | 5/2008 |
| JP | 2010-150535 A | 7/2010 |
| JP | 2010-189633 A | 9/2010 |
| JP | 2010-222477 A | 10/2010 |
| JP | 2010-254896 A | 11/2010 |

OTHER PUBLICATIONS

International Search Report of PCT/JP2011/006263, mailing date of Feb. 14, 2012.

*Primary Examiner* — Patrick Niland
(74) *Attorney, Agent, or Firm* — Westerman, Hattori, Daniels & Adrian, LLP

(57) ABSTRACT

Provided is a slush molding material which exhibits excellent low-temperature meltability and heat resistance and which can yield a molded product having excellent tensile strength and elongation. The present invention is urethane resin particles (D1) comprising a urethane or urethane-urea resin (U1) that has residues (j) bonded thereto covalently, said residues (j) being residues derived from an at least trivalent aromatic polycarboxylic acid by removing hydroxyl groups, or urethane resin particles (D2) comprising a urethane resin composition (S2) which comprises both a urethane or urethane-urea resin (U2) and a compound (E) that has a residue (j) derived from an at least trivalent aromatic polycarboxylic acid by removing hydroxyl groups, said compound (E) being represented by general formula (1), wherein the residues (j) are linked respectively to urethane or urea groups (u) of the resin (U1) or (U2) by hydrogen bonds.

12 Claims, 2 Drawing Sheets

URETHANE RESIN PARTICLES

TECHNICAL FIELD

The present invention relates to urethane resin particles.

BACKGROUND ART

Conventionally, in order to improve adhesion properties to a core cloth, water-resistant washability, and dry cleaning resistance, there has been suggested a hot melt adhesive composed of a thermoplastic polyurethane resin in which a difference between the softening start temperature and the softening end temperature, and the softening start temperature are set to specified ranges, the temperatures being according to a needle-penetrating mode of thermomechanical analysis. It is stated that this adhesive is also used as a material for slush molding (see, for example, Patent Document 1).

Regarding resin particles used for powder coating, electrophotographic toner, and electrostatic recording toner, there have been suggested urethane resin particles which are meltable at low temperatures by adjusting the crystallinity, the melting point, and the molecular weight. It is stated that the particles are also used as a material for slush molding (see, for example, Patent Documents 2 and 3).

In recent years, as an instrument panel which is an interior part of an automobile, a slush molded product is used. In order to achieve low cost and high cycle of slush molding as well as long life of a mold, molding at low temperatures is demanded (see, for example, Patent Document 4). On the other hand, a cleavage is located in the instrument panel so as to expand an airbag stored under the instrument panel. For processing of the cleavage, from the viewpoint of design, a method of slitting the rear surface of the slush molded product by using a cutter is employed. However, in the region of high temperatures, the slit on the rear surface is fused by heat and disappears, so that the airbag may not open normally. Therefore, a slush molding material with excellent heat resistance is demanded (see, for example, Patent Documents 5 and 6).

In automobile parts, there is a need for weight saving for the purpose of improving fuel consumption. As a measure for achieving weight saving of interior materials of an automobile, it is considered a measure of making a slush molded body into a thinner form. However, the thinner form reduces mechanical properties of the molded body, so that it is necessary to provide stronger mechanical properties.

PRIOR ART DOCUMENTS

Patent Documents

Patent Document 1: JP-A-H10-259369
Patent Document 2: JP-A-2010-150535
Patent Document 3: JP-A-2010-189633
Patent Document 4: JP-A-2010-222477
Patent Document 5: JP-A-2007-283865
Patent Document 6: JP-A-2002-326241

SUMMARY OF THE INVENTION

Problems to be Solved by the Invention

Accordingly, it is desired that a material for slush molding, in particular, a material that is suitably applicable to interiors of an automobile satisfies requirements that the material is excellent in meltability when subjected to slush molding, a slush molded body is excellent in heat resistance and mechanical properties, and the like. When attention is paid to polyurethane-based materials, a material for slush molding that sufficiently satisfies all of these properties is not yet known.

An object of the present invention is to provide a material for slush molding that is excellent in all properties: meltability thereof and heat resistance and mechanical properties of a molded body.

Solutions to the Problems

The present inventors have made eager investigations in order to solve the above-mentioned problems, thereby achieving the present invention.

The present invention provides urethane resin particles (D) which are either of the following: urethane resin particles (D1) comprising a urethane or urethane-urea resin (U1) that has residues (j) bonded thereto covalently, the residues (j) being residues derived from a tri- or more valent aromatic polycarboxylic acid by removing hydroxyl groups; or urethane resin particles (D2) comprising a urethane resin composition (S2) which comprises both a urethane or urethane-urea resin (U2) and a compound (E) that has a residue (j) derived from a tri- or more valent aromatic polycarboxylic acid by removing hydroxyl groups, the compound (E) being represented by the general formula (1) below, wherein the residues (j) derived from a tri- or more valent aromatic polycarboxylic acid by removing hydroxyl groups are linked respectively to urethane or urea groups (u) of the (U1) or (U2) by hydrogen bonds; and a thermoplastic urethane resin particle composition (P) for slush molding, comprising the urethane resin particles (D) and an additive (F) which is at least one kind selected from the group consisting of an inorganic filler, a pigment, a plasticizer, a releasing agent, a blocking inhibitor, and a stabilizer.

[Chemical Formula 1]

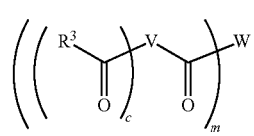

(1)

[In the general formula (1), $R^3$ represents a residue derived from a monovalent or polyvalent active hydrogen-containing compound by removing one active hydrogen, or an OH group, and a plurality of $R^3$ may be the same or different from each other; V represents a residue derived from a tri- or more valent aromatic polycarboxylic acid by removing all carboxyl groups, and in the aromatic ring of V, a hydrogen atom is bonded to at least one ring carbon; c is an integer satisfying $2 \leq c \leq$ (the number of substituents capable of being directly linked to the aromatic ring$-2$); W represents a residue derived from an m- or more valent active hydrogen-containing compound by removing m active hydrogens; and m is an integer of 2 to 10.1.

Effects of the Invention

The thermoplastic urethane resin particle composition (P) for slush molding containing the urethane resin particles (D1) or (D2) according to the present invention is excellent in all three properties: meltability of the (P) and heat resistance and mechanical properties of a molded body of the (P).

MODE FOR CARRYING OUT THE INVENTION

<Urethane Resin or Urethane-Urea Resin (U1)>

Figure 1:
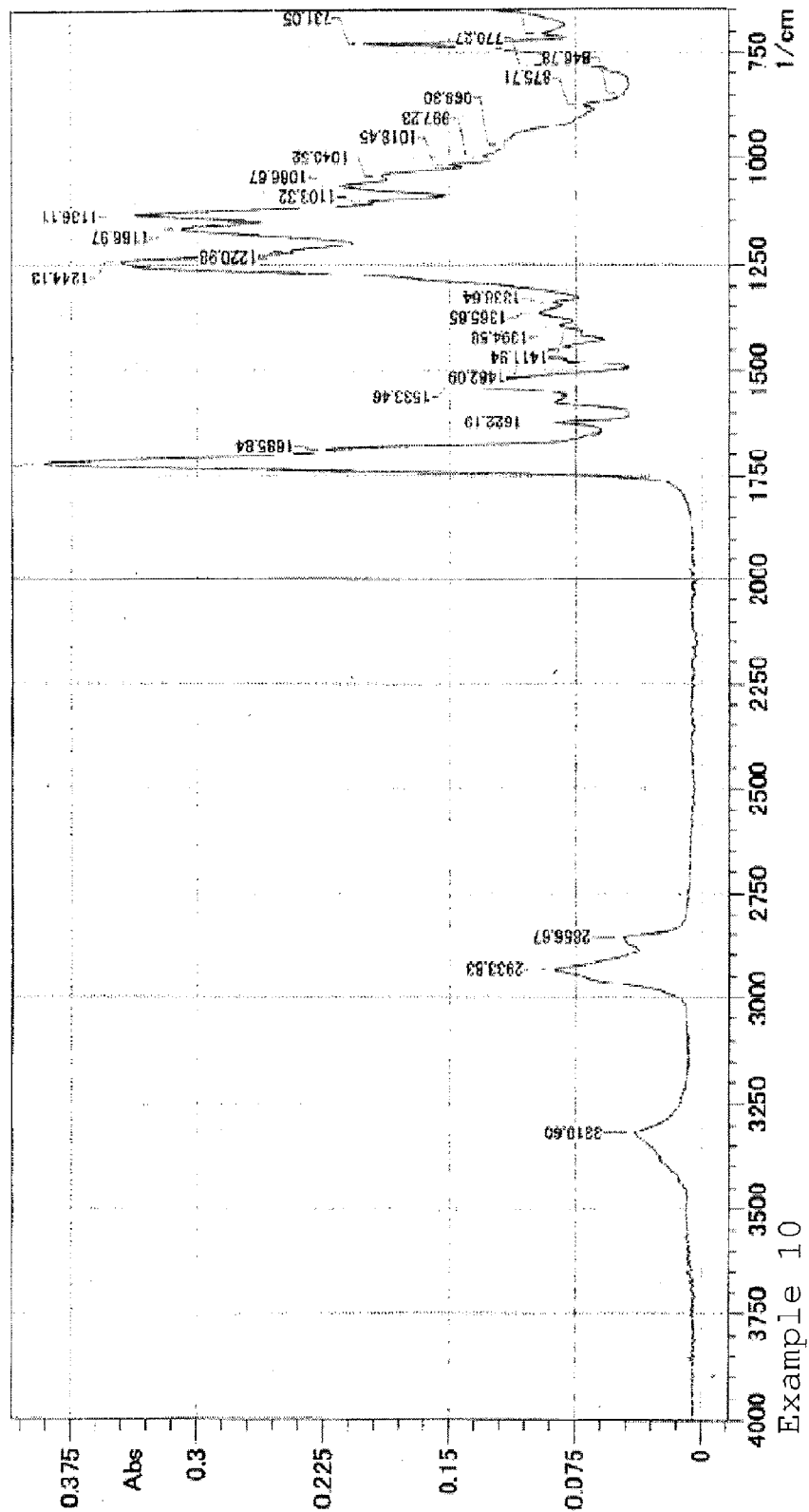
FIG. 1 is a measurement result of infrared absorption spectrum (Example 10).

Urethane resin particles (D1) according to the present invention are characterized by comprising a urethane or urethane-urea resin (U1) that has residues (j) bonded thereto covalently, the residues (j) being residues derived from a tri- or more valent aromatic polycarboxylic acid by removing hydroxyl groups, wherein the residues (j) derived from a tri- or more valent aromatic polycarboxylic acid by removing hydroxyl groups are linked to urethane or urea groups (u) of the (U1) by hydrogen bonds.

By introducing the hydrogen bonds into the (U1) constituting the (D1), there can be excellently provided all three properties: meltability of the (D1) and heat resistance and mechanical properties of a molded body of the (D1).

The hydrogen bonds between the urethane or urea groups (u) of the (U1) and the residues (j) can be confirmed by the appearance of absorption near 1680 to 1720-cm$^{-1}$ in the infrared absorption spectrum (hereinbelow, it may be described as IR spectrum).

The (U1) preferably has a structural unit (x) represented by the general formula (2) below.

[Chemical Formula 2]

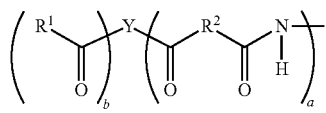

(2)

In the general formula (2), $R^1$ represents a residue derived from a monovalent or polyvalent active hydrogen-containing compound ($R^1H$) by removing one active hydrogen, or an OH group. A plurality of $R^1$ may be the same or different from each other. $R^2$ represents a residue derived from a divalent active hydrogen-containing compound ($R^2H$) by removing two active hydrogens. A plurality of $R^2$ may be the same or different from each other. Y is a residue derived from a tri- or more valent aromatic polycarboxylic acid by removing all carboxyl groups. a and b are each integers satisfying $1 \le a \le$ (the number of substituents capable of being directly linked to the aromatic ring$-b$), $0 \le b \le$ (the number of substituents capable of being directly linked to the aromatic ring$-a$), and $3 \le a+b \le 8$.

The active hydrogen-containing compound ($R^1H$) includes those having a carbon number of 1 to 30, of a hydroxyl group-containing compound, an amino group-containing compound, a carboxyl group-containing compound, a thiol group-containing compound, and a phosphoric acid compound; and a compound having two or more kinds of active hydrogen-containing functional groups in the molecule.

The hydroxyl group-containing compound includes monohydric alcohols, di- to octahydric polyalcohols, phenolic compounds, polyphenolic compounds, and the like. Specific examples thereof include monohydric alcohols such as methanol, ethanol, butanol, octanol, benzyl alcohol, and naphthylethanol; dihydric alcohols such as ethylene glycol, propylene glycol, 1,3- and 1,4-butanediol, 1,6-hexanediol, 1,10-decanediol, diethylene glycol, neopentyl glycol, cyclohexanediol, cyclohexanedimethanol, 1,4-bis(hydroxymethyl)cyclohexane, and 1,4-bis(hydroxyethyl)benzene; trihydric alcohols such as glycerol and trimethylolpropane; tetra- to octahydric alcohols such as pentaerythritol, sorbitol, mannitol, sorbitan, diglycerin, dipentaerythritol, sucrose, glucose, mannose, fructose, methyl glucoside and derivatives thereof; phenolic compounds such as phenol, phloroglucin, cresol, pyrogallol, catechol, hydroquinone, bisphenol A, bisphenol F, bisphenol S, 1-hydroxynaphthalene, 1,3,6,8-tetrahydroxynaphthalene, anthrol, 1,4,5,8-tetrahydroxyanthracene, and 1-hydroxypyrene; polybutadiene polyols; castor oil-based polyols; polyfunctional (for example, the number of functional groups is 2 to 100) polyols such as a (co)polymer of hydroxyalkyl (meth)acrylate and polyvinyl alcohol, condensates (novolaks) of phenol and formaldehyde, polyphenolic compounds described in the description of U.S. Pat. No. 3,265,641, and the like. Among these, benzyl alcohol is preferable from the viewpoint of productivity.

It is to be noted that (meth)acrylate means methacrylate and/or acrylate, and the same applies hereinbelow.

The amino group-containing compound includes amines, polyamines, amino alcohols and the like. Specific examples thereof include ammonia; monoamines such as alkylamines having a carbon number of 1 to 20 (such as butylamine) and aniline; aliphatic polyamines such as ethylenediamine, hexamethylenediamine, and diethylenetriamine; heterocyclic polyamines such as piperazine and N-aminoethylpiperazine; alicyclic polyamines such as dicyclohexylmethanediamine and isophoronediamine; aromatic polyamines such as phenylenediamine, tolylenediamine, and diphenylmethanediamine; alkanolamines such as monoethanolamine, diethanolamine, and triethanolamine; polyamidepolyamines obtained by condensation of a dicarboxylic acid with an excess of polyamine; polyetherpolyamines; hydrazines (hydrazine, monoalkylhydrazine, etc.), dihydrazides (dihydrazide succinate, dihydrazide terephthalate, etc.), and guanidines (butylguanidine, 1-cyanoguanidine, etc.); dicyandiamide, and the like.

Examples of the carboxyl group-containing compound include aliphatic monocarboxylic acids such as acetic acid and propionic acid; aromatic monocarboxylic acids such as benzoic acid; aliphatic dicarboxylic acids such as succinic acid, fumaric acid, sebacic acid, and adipic acid; aromatic polycarboxylic acids such as phthalic acid, isophthalic acid, terephthalic acid, trimellitic acid, naphthalene-1,4-dicarboxylic acid, naphthalene-2,3,6-tricarboxylic acid, pyromellitic acid, diphenic acid, 2,3-anthracenedicarboxylic acid, 2,3,6-anthracenetricarboxylic acid, and pyrenedicarboxylic acid; polycarboxylic acid polymers (the number of functional groups is 2 to 100) such as a (co)polymer of acrylic acid; and the like.

The thiol group-containing compound includes monofunctional phenylthiols, alkylthiols, and polythiol compounds. Examples of the polythiols include di- to octavalent polythiols. Specific examples thereof include ethylenedithiol and 1,6-hexanedithiol.

Examples of the phosphoric acid compound include phosphoric acid, phosphorous acid, and phosphoric acid.

The active hydrogen-containing compound ($R^1H$) also includes a compound having two or more kinds of active hydrogen-containing functional groups (a hydroxyl group, an amino group, a carboxyl group, a thiol group, a phosphoric acid group, etc.) in the molecule.

The active hydrogen-containing compound ($R^1H$) also includes a compound obtained by adding an alkylene oxide to the above-described active hydrogen-containing compound.

Examples of the alkylene oxide (hereinbelow abbreviated as AO) to be added include AOs having a carbon number of 2 to 6 such as ethylene oxide (hereinbelow abbreviated as EO), 1,2-propylene oxide (hereinbelow abbreviated as PO), 1,3-propylene oxide, 1,2-butylene oxide, and 1,4-butylene oxide. Among these, PO, EO and 1,2-butylene oxide are preferable from the viewpoint of properties and reactivity. In the case where two or more kinds of AOs (for example, PO and EO) are used, an addition method may be block addition or random addition, or these methods may be used in combination.

Further, as the active hydrogen-containing compound ($R^1H$), an active hydrogen-containing compound (polyester compound) obtained by a condensation reaction of a diol with a dicarboxylic acid (an aliphatic dicarboxylic acid or an aromatic dicarboxylic acid) can be used. In the condensation reaction, both an active hydrogen-containing compound and a polycarboxylic acid may be used alone or two or more kinds may be used in combination.

Examples of the aliphatic dicarboxylic acid include succinic acid, adipic acid, sebacic acid, maleic acid, and fumaric acid.

Examples of the aromatic dicarboxylic acid include aromatic polycarboxylic acids having a carbon number of 8 to 18 such as phthalic acid, isophthalic acid, terephthalic acid, 2,2'-bibenzyl dicarboxylic acid, hemimellitic acid, trimesic acid, and naphthalene-1,4-dicarboxylic acid, diphenic acid, 2,3-anthracenedicarboxylic acid, and pyrenedicarboxylic acid.

In the case where a condensation reaction of a dicarboxylic acid with a diol is performed, an anhydride or lower alkyl ester of a polycarboxylic acid can also be used.

Examples of the active hydrogen-containing compound ($R^2H$) include, among the above-described ($R^1H$), divalent active hydrogen-containing compounds.

Specific examples of the dihydric hydroxyl group-containing compound include dihydric alcohols such as ethylene glycol, propylene glycol, 1,3- and 1,4-butanediol, 1,6-hexanediol, 1,10-decanediol, diethylene glycol, neopentyl glycol, cyclohexanediol, cyclohexanedimethanol, 1,4-bis(hydroxymethyl)cyclohexane, and 1,4-bis(hydroxyethyl)benzene.

Specific examples of the divalent amino group-containing compound include aliphatic diamines such as ethylenediamine and hexamethylenediamine; alicyclic diamines such as dicyclohexylmethanediamine and isophoronediamine; and aromatic diamines such as phenylenediamine, tolylenediamine, and diphenylmethanediamine.

Specific examples of the divalent carboxyl group-containing compound include aliphatic dicarboxylic acids such as succinic acid, fumaric acid, sebacic acid, and adipic acid; and aromatic dicarboxylic acids such as phthalic acid, isophthalic acid, terephthalic acid, naphthalene-1,4-dicarboxylic acid, and 2,3-anthracenedicarboxylic acid.

Specific examples of the divalent thiol group-containing compound include ethylenedithiol, 1,6-hexanedithiol, and the like.

From the viewpoint of improvement in mechanical properties (elongation and tensile strength) of a urethane resin molded body, the divalent active hydrogen-containing compound ($R^2H$) is preferably a divalent hydroxyl group-containing compound or a divalent amino group-containing compound; more preferably ethylene glycol, propylene glycol, diethylamine, or dibutylamine; and most preferably ethylene glycol.

As $R^2$ in the general formulae (2) and (3), $-O(CH_2CH_2O)_n-$ (n is $1 \leq n \leq 5$) and $-O(CH_2CHCH_2O)_n-$ (n is $1 \leq n \leq 5$) are also preferable. These groups can be obtained by adding each EO and PO to a carboxyl group of a tri- or more valent aromatic polycarboxylic acid.

Y represents a residue derived from a tri- or more valent aromatic polycarboxylic acid by removing all carboxyl groups. The atoms constituting the aromatic ring of Y are only carbon atoms. The substituent of the aromatic ring may be a hydrogen atom or other substituents, but at least one substituent is a hydrogen atom. That is, the aromatic ring of Y has at least one hydrogen atom bonded to carbon atoms constituting the aromatic ring.

Examples of the other substituents include an alkyl group, a vinyl group, an allyl group, a cycloalkyl group, a halogen atom, an amino group, a carbonyl group, a carboxyl group, a hydroxyl group, a hydroxyamino group, a nitro group, a phosphino group, a thio group, a thiol group, an aldehyde group, an ether group, an aryl group, an amide group, a cyano group, a urea group, a urethane group, a sulfone group, an ester group, an azo group, and the like. From the viewpoint of improvement in mechanical properties (elongation, tensile strength, and compression hardness) and cost, the other substituents are preferably an alkyl group, a vinyl group, an allyl group, an amino group, an amide group, a urethane group, and a urea group.

The arrangement of substituents on Y is preferably a structure below, from the viewpoint of improvement in mechanical properties.

In the case of a trivalent aromatic polycarboxylic acid; preferred is a structure in which two carbonyl groups are adjacent to each other, and hydrogen is arranged, as a substituent, between the third carbonyl group and the first or second carbonyl group.

In the case of a tetra- or more valent aromatic polycarboxylic acid; preferred is a structure in which two carbonyl groups are adjacent to each other, and hydrogen is arranged, as a substituent, between the third and subsequent carbonyl groups and the first or second carbonyl group.

Examples of the tri- or more valent aromatic polycarboxylic acid (YH) constituting Y include aromatic polycarboxylic acids having a carbon number of 8 to 18 such as benzene polycarboxylic acids (trimellitic acid, hemimellitic acid, trimesic acid, pyromellitic acid, etc.) and polycyclic aromatic polycarboxylic acids (naphthalene-2,3,6-tricarboxylic acid, etc.).

Among the tri- or more valent aromatic polycarboxylic acids (YH), a benzene polycarboxylic acid is preferable. That is, the residue (j) derived from a tri- or more valent aromatic polycarboxylic acid by removing hydroxyl groups is preferably a residue derived from a benzene polycarboxylic acid by removing hydroxyl groups.

It is preferable that, in the case where the number of carboxyl groups of the benzene polycarboxylic acid is 3, the substitution positions of the carboxyl groups are at 1, 2, 4-position (trimellitic acid), and in the case where the number of carboxyl groups is 4, the substitution positions of the carboxyl groups are at 1, 2, 4, 5-position (pyromellitic acid) or 1, 2, 3, 4-position.

a and b are each an integer satisfying $1 \leq a \leq$ (the number of substituents capable of being directly linked to the aromatic ring$-b$), $0 \leq b \leq$ (the number of substituents capable of being directly linked to the aromatic ring$-a$), and $3 \leq a+b \leq 8$.

The number of substituents capable of being directly linked to the aromatic ring refers to the number of hydrogen atoms bonded to ring carbons of an aromatic hydrocarbon having only an aromatic ring that forms an aromatic polycarboxylic acid, for example a compound such as benzene or naphthalene. In the case of benzene, it is 6, and in the case of naphthalene, it is 8.

An active hydrogen-containing compound (C) mentioned later can be obtained by performing a dehydration condensation reaction of the tri- or more valent aromatic polycarboxylic acid (YH) with the divalent active hydrogen-containing compound ($R^2H$) and the active hydrogen-containing compound ($R^1H$) in a proportion satisfying a and b defined in the general formula (3).

Instead of the dehydration condensation reaction with the ($R^2H$), the (C) can be obtained by performing a reaction of adding an AO (EO, PO, etc.) to a carboxyl group. Further, instead of using the ($R^1H$), the (C) is preferably obtained by performing a dehydrochlorination reaction of a monochloride that has an organic group with a carbon number of 1 to 30, from the viewpoint of reaction temperature.

As the monochloride, a monochloride having a chloromethylene group is preferable, and particularly preferably benzyl chloride.

The urethane or urethane-urea resin (U1) is a polyurethane resin obtained by reacting an active hydrogen component (A) with an isocyanate component (B), and the polyurethane can be obtained by using, as a part of the active hydrogen component (A), an active hydrogen-containing compound (C) represented by the general formula (3).

[Chemical Formula 3]

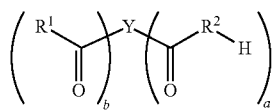
(3)

In the general formula (3), $R^1$, $R^2$, Y, a and b are the same as those in the general formula (2).

From the viewpoint of achieving both low temperature meltability of the urethane resin particles and tensile strength, elongation, and heat resistance of a molded body thereof, $R^2$ in the general formula (2) or (3) is preferably represented by the general formula (4) below:

[Chemical Formula 4]

—O—$R^4$—O—   (4)

wherein, $R^4$ is a divalent aliphatic hydrocarbon group having a carbon number of 2 to 10, and preferably 2 to 4. More preferably $R^4$ is an ethylene group.

From the viewpoint of achieving both low temperature meltability of the urethane resin particles and tensile strength, elongation, and heat resistance of a molded body thereof, $R^2$ in the general formula (2) or (3) is preferably represented by the general formula (5) below:

[Chemical Formula 5]

—O—$CH_2$—$R^5$   (5)

wherein, $R^5$ is a monovalent hydrocarbon group having a carbon number of 1 to 29, and preferably a phenyl group.

The (U1) contains the structural unit (x) represented by the general formula (2) in an amount of preferably 0.1 to 30% by weight, more preferably 0.5 to 20% by weight, and most preferably 1.0 to 10.0% by weight based on the weight of the (U1), from the viewpoint of achieving both meltability of the urethane resin particles and mechanical strength and heat resistance of a molded body thereof.

In the (U1), a in the general formulae (2) and (3) is preferably 1 or 2, from the viewpoint of meltability of the urethane resin particles.

In the case where the (U1) is a urethane or urethane-urea resin (U11) having a structural unit (x1) in which a is 1 at the end of the molecule in the general formulae (2) and (3), the structural unit (x1) is preferably contained in an amount of 0.1 to 5% by weight, more preferably 0.5 to 4% by weight, and most preferably 1 to 3% by weight based on the weight of the (U11), from the viewpoint of achieving both meltability thereof and mechanical strength and heat resistance of a molded body thereof.

In the case where the (U1) is a urethane or urethane-urea resin (U12) having a structural unit (x2) in which a is 3 or 4 in the general formulae (2) and (3), the structural unit (x2) is preferably contained in an amount of 0.1 to 3% by weight, more preferably 0.1 to 2% by weight, and most preferably 0.1 to 1% by weight based on the weight of the (U12), from the viewpoint of meltability thereof and mechanical strength and heat resistance of a molded body thereof.

In the urethane or urethane-urea resin (U1), examples of the active hydrogen component (A) other than the active hydrogen-containing compound (C) represented by the general formula (3) include a polyester diol (A1), a polyether diol (A2), and a polyetherester diol (A3).

Examples of the polyester diol (A1) include (1) one obtained by condensation polymerization of a low-molecular weight diol and a dicarboxylic acid or an ester-forming derivative [an acid anhydride, a lower alkyl (the carbon number is 1 to 4) ester, an acid halide, etc.]; (2) one obtained by ring-opening polymerization of lactone monomers using a low-molecular weight diol as an initiator; and a mixture of two or more kinds of these.

Specific examples of the above-described low-molecular weight diol include aliphatic diols [linear diols (ethylene glycol, diethylene glycol, 1,3-propanediol, 1,4-butanediol, 1,5-pentanediol, 1,6-hexanediol, etc.), diols having a branched chain (propylene glycol, neopentyl glycol, 3-methyl-1,5-pentanediol, 2,2-diethyl-1,3-propanediol, 1,2-, 1,3-, or 2,3-butanediol, etc.), etc.]; diols having a cyclic group [e.g., diols described in JP S45-1474 B; aliphatic cyclic group-containing diols (1,4-bis(hydroxymethyl)cyclohexane, hydrogenated bisphenol A, etc.), aromatic ring group-containing diols (m- and p-xylylene glycol, alkylene oxide adducts of bisphenol A, alkylene oxide adducts of bisphenol S, alkylene oxide adducts of bisphenol F, alkylene oxide adducts of dihydroxynaphthalene, bis(2-hydroxyethyl) terephthalate, etc.)], and a mixture of two or more kinds of these. Among these, aliphatic diols and diols having a cyclic group are preferable.

Specific examples of the above-described dicarboxylic acid or ester-forming derivative thereof include aliphatic dicarboxylic acids having a carbon number of 4 to 15 [succinic acid, adipic acid, sebacic acid, glutaric acid, azelaic acid, maleic acid, fumaric acid, etc.], aromatic dicarboxylic acids having a carbon number of 8 to 12 [terephthalic acid, isophthalic acid, etc.], ester-forming derivatives of these [acid anhydrides, lower alkyl esters (dimethyl ester, diethyl ester, etc.), acid halides (acid chloride, etc.), etc.], and a mixture of two or more kinds of these.

Examples of the above-described lactone monomer include γ-butyrolactone, ε-caprolactone, γ-valerolactone, and a mixture of two or more kinds of these.

Specific examples of the polyester diol (A1) include polyethylene adipate diol, polybutylene adipate diol, polyethylenebutylene adipate diol, polyneopentylene adipate diol, poly3-methylpentylene adipate diol, polycaprolactone diol, polyvalerolactone diol, polyhexamethylene carbonate diol, and the like.

Examples of the polyether diol (A2) include compounds having a structure in which an alkylene oxide is added to a compound having two hydroxyl groups (e.g., the above-mentioned low-molecular weight diols and divalent phenolic compounds). Examples of the above-described dihydric phenolic compounds include bisphenols [bisphenol A, bisphenol F, bisphenol S, etc.], monocyclic phenolic compounds [catechol, hydroquinone, etc.], and the like.

Among these, compounds obtained by adding an alkylene oxide to a dihydric phenolic compound are preferable, and compounds obtained by adding EO to a dihydric phenolic compound are more preferable.

Examples of the polyetherester diol (A3) include diols obtained by using, instead of the low-molecular weight diol that is a raw material for the above-mentioned polyester diol, the above-described polyether diol, for example diols obtained by polycondensation of one or more kinds of the above-described polyether diols with one or more kinds of the dicarboxylic acids or ester-forming derivatives of these given as the examples of a raw material for the above-mentioned polyester diol. Specific examples thereof include polyethylene glycol, polypropylene glycol, polytetramethylene glycol, and the like.

The active hydrogen component (A) other than diols having the structural unit represented by the general formula (3), is preferably one containing no ether bond, from the viewpoint of heat resistance and light resistance.

Examples of the isocyanate component (B) constituting the urethane or urethane-urea resin (U1) include:
(i) aliphatic diisocyanates having a carbon number of 2 to (which do not include any carbon in its NCO groups; the same applies hereinbelow) [ethylenediisocyanate, tetramethylenediisocyanate, hexamethylenediisocyanate (HDI), dodecamethylenediisocyanate, 2,2,4-trimethylhexamethylenediisocyanate, lysinediisocyanate, 2,6-diisocyanatomethyl caproate, bis(2-isocyanatoethyl)fumarate, bis(2-isocyanatoethyl)carbonate, 2-isocyanatoethyl-2,6-diisocyanatohexanoate, etc.];
(ii) alicyclic diisocyanates having a carbon number of 4 to 15 [isophoronediisocyanate (IPDI), dicyclohexylmethane-4,4'-diisocyanate (hydrogenated MDI), cyclohexylenediisocyanate, methylcyclohexylenediisocyanate (hydrogenated TDI), bis(2-isocyanatoethyl)-4-cyclohexene, etc.];
(iii) aromatic aliphatic diisocyanates having a carbon number of 8 to 15 [m- and/or p-xylylenediisocyanate(s) (XDI), α,α,α',α'-tetramethylxylylenediisocyanate (TMXDI), etc.]; specific examples of aromatic polyisocyanates include 1,3- and/or 1,4-phenylene diisocyanate(s), 2,4- and/or 2,6-tolylenediisocyanate(s) (TDI), crude TDI, 2,4'- and/or 4,4'-diphenylmethanediisocyanate(s) (MDI), 4,4'-diisocyanatobiphenyl, 3,3'-dimethyl-4,4'-diisocyanatobiphenyl, 3,3'-dimethyl-4,4'-diisocyanatodiphenylmethane, crude MDI, 1,5-naphthylenediisocyanate, 4,4',4"-triphenylmethanetriisocyanate, m- and p-isocyanatophenylsulfonylisocyanates, and the like;
(iv) modified products of these diisocyanates (diisocyanate modified products having a carbodiimide group, a urethodione group, a urethoimine group, a urea group, etc.); and a mixture of two or more kinds of these. Among these, aliphatic diisocyanates or alicyclic diisocyanates are preferable, and HDI, IPDI, and hydrogenated MDI are particularly preferable.

The urethane or urethane-urea resin (U1) is obtained by reacting the active hydrogen component (A) with the isocyanate component (B), and further with a low-molecular weight diamine or low-molecular weight diol (K).

Specific examples of the low-molecular weight diamine or low-molecular weight diol (K) constituting the urethane or urethane-urea resin (U1) are as follows.

Examples of an aliphatic diamine include alicyclic diamines having a carbon number of 6 to 18 [4,4'-diamino-3,3'-dimethyldicyclohexylmethane, 4,4'-diaminodicyclohexylmethane, diaminocyclohexane, isophoronediamine, etc.]; aliphatic diamines having a carbon number of 2 to 12 [ethylenediamine, propylenediamine, hexamethylenediamine, etc.]; aromatic aliphatic diamines having a carbon number of 8 to 15 [xylylenediamine, α,α,α',α'-tetramethylxylylenediamine, etc.]; and a mixture of two or more kinds of these. Among these, alicyclic diamines and aliphatic diamines are preferable, and isophoronediamine and hexamethylenediamine are particularly preferable.

Examples of the low-molecular weight diol include aliphatic diols having a carbon number of 2 to 8 [linear diols (ethylene glycol, diethylene glycol, 1,3-propanediol, 1,4-butanediol, 1,5-pentanediol, 1,6-hexanediol, etc.), diols having a branched chain (propylene glycol, neopentyl glycol, 3-methyl-1,5-pentanediol, 2,2-diethyl-1,3-propanediol, 1,2-, 1,3-, or 2,3-butanediol, etc.), etc.]; diols having a cyclic group [alicyclic group-containing diols having a carbon number of 6 to 15 [1,4-bis(hydroxymethyl)cyclohexane, hydrogenated bisphenol A, etc.], aromatic ring-containing diols having a carbon number of 8 to 20 (m- or p-xylylene glycol, etc.), oxyalkylene ethers of bisphenols (bisphenol A, bisphenol S, bisphenol F, etc.), oxyalkylene ethers of polynuclear phenolic compounds (dihydroxynaphthalene, etc.), bis(2-hydroxyethyl)terephthalate, etc.]; and alkylene oxide adducts (the molecular weight is less than 500) of these, and a mixture of two or more kinds of these. Among the low-molecular weight diols, aliphatic diols and alicyclic group-containing diols are preferable.

A method for adjusting the molecular weight of the urethane or urethane-urea resin (U1) may be a method of partially blocking isocyanate groups of an isocyanate group-terminated urethane prepolymer with a mono-functional alcohol. Examples of the above-described monool include aliphatic monools having a carbon number of 1 to 8 [linear monools (methanol, ethanol, propanol, butanol, pentanol, hexanol, octanol, etc.), monools having a branched chain (isopropyl alcohol, neopentyl alcohol, 3-methyl-pentanol, 2-ethylhexanol, etc.]; monools having a cyclic group with a carbon number of 6 to 10 [alicyclic group-containing monools (cyclohexanol, etc.), aromatic ring-containing monools (benzyl alcohol, etc.), etc.]; and a mixture of two or more kinds of these. Among these, aliphatic monools and aromatic ring-containing monools are preferable. Examples of a high-molecular weight monool include polyester monools, polyether monools, polyetherester monools, and a mixture of two or more kinds of these.

In the general formula (2), also regarding a polyol in which a is 1, isocyanate groups of the isocyanate group-terminated urethane prepolymer are partially blocked, so that the molecular weight can be adjusted.

Examples of a method for producing the urethane or urethane-urea resin (U1) include the following methods:
(1) a method of allowing an active hydrogen component (A) in which a mixture of a polyester diol (A1) and an active hydrogen-containing compound (C) represented by the general formula (3) is contained beforehand to react with a diisocyanate component (B) to produce a urethane prepolymer (G)

having isocyanate groups at the end thereof, and then mixing this prepolymer (G) with a low-molecular weight diamine or low-molecular weight diol (K) to extend the prepolymer, thereby preparing a urethane resin;

(2) a method of mixing the (A), the (B), and the (K) at one time to allow the components to react with one another; and the like.

The reaction temperature in producing the urethane prepolymer (G) may be the same as adopted usually at the time of urethanization. When a solvent is used, the temperature is usually 20° C. to 100° C. When no solvent is used, the temperature is usually 20° C. to 140° C., preferably 80° C. to 130° C. In the above-described prepolymerization reaction, a catalyst usually used for polyurethane may be used so as to promote the reaction, if necessary. Examples of the catalyst include amine-based catalysts [triethylamine, N-ethylmorpholine, triethylenediamine, etc.], tin-based catalysts [trimethyltin laurate, dibutyltin dilaurate, dibutyltin maleate, etc.], and the like.

The melt viscosity of the urethane or urethane-urea resin (U1) at 190° C. is preferably 500 to 2000 Pa·s, and more preferably 500 to 1000 Pa·s, from the viewpoint of meltability of the urethane resin particles (D) being good.

The storage modulus G' of the (U1) at 130° C. is preferably 0.2 to 10 MPa, and more preferably 0.5 to 2 MPa, from the viewpoint of heat resistance of the (U1) and meltability of the urethane resin particles being good.

<Urethane Resin Composition (S2) Containing Compound (E) Represented by General Formula (1) and Urethane or Urethane-Urea Resin (U2)>

Urethane resin particles (D2) according to the present invention contain a urethane resin composition (S2) including both a urethane or urethane-urea resin (U2) and a compound (E) that has a residue (j) derived from a tri- or more valent aromatic polycarboxylic acid by removing hydroxyl groups, the compound (E) being represented by the general formula (1) below, wherein the residues (j) derived from a tri- or more valent aromatic polycarboxylic acid by removing hydroxyl groups are linked to urethane or urea groups (u) of the (U2) by hydrogen bonds.

By introducing the hydrogen bonds into the (S2), there can be excellently provided all three properties: meltability of the (S2) and heat resistance and mechanical properties of a molded body of the (S2).

The hydrogen bonds between the urethane or urea groups (u) of the (U2) and the residues (j) can be confirmed by the appearance of absorption near 1680 to 1720-cm$^{-1}$ in the IR spectrum.

[Chemical Formula 6]

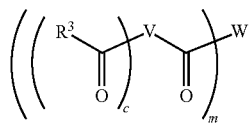

(1)

In the general formula (1), $R^3$ is a residue derived from a monovalent or polyvalent active hydrogen-containing compound ($R^3H$) by removing one active hydrogen, or an OH group, and a plurality of $R^3$ may be the same or different from each other; V is a residue derived from a tri- or more valent aromatic polycarboxylic acid by removing all carboxyl groups, and in the aromatic ring of V, a hydrogen atom is bonded to at least one ring carbon; c is an integer satisfying 2≤c≤(the number of substituents capable of being directly linked to the aromatic ring–2); W is a residue derived from an m- or more valent active hydrogen-containing compound (WH) by removing m active hydrogens; and m is an integer of 2 to 10.

$R^3$ is the same as the above-described $R^1$ in the general formula (2).

V is the same as the above-described Y in the general formula (2).

W is m- or more valent and is the same as the residue derived from the above-described active hydrogen-containing compound ($R^1H$) by removing m active hydrogens in the general formula (2).

The active hydrogen-containing compound represented by (WH) may be the same as or different from the ($R^1H$). In the general formula (1), m is an integer of 2 to 10.

From the viewpoint of handling of the compound (E) and improvement in mechanical properties (elongation and tensile strength) of a urethane resin molded body, as the (WH), it is preferable to use a hydroxyl group-containing compound, an amino group-containing compound, AO adducts of these, and condensates of these with a polycarboxylic acid, and m is preferably 2 to 8.

From the viewpoint of improvement in tensile strength and elongation of a molded body of the urethane resin particles, the (U2) contains the compound (E) in an amount of preferably 0.1 to 10% by weight, and more preferably 0.5 to 9% by weight based on the weight of the (U2).

The difference of solubility parameter (Δ SP value) between the (E) and the (U2) is preferably 0 to 1.5, more preferably 0 to 1.4, and further preferably 0 to 1.3. When the Δ SP value is within the above-described range, the visibility of a driver is not damaged due to formation (fogging) of an oil film on the windshield of a vehicle and the like, and deposition (bleed-out) on the surface of a molded product does not occur.

The solubility parameter (SP value) is calculated by the Fedors method and is represented by the following formula:

$$SP\ value\ (\delta) = (\Delta H/V)^{1/2}$$

wherein, ΔH represents the molar evaporation heat (cal), and V represents the molar volume (cm$^3$).

ΔH and V can refer to the total (ΔH) of the respective molar evaporation heats of atomic groups and the total (V) of the respective molar volumes thereof, described in "POLYMER ENGINEERING AND SCIENCE FEBRUARY, 1974, Vol. 14, No. 2, ROBERT F. FEDORS (pp. 151-153)".

The SP value is an index for representing the following: samples near to each other in this value are easily mixed with each other (the compatibility is high); and samples apart from each other in this value are not easily mixed with each other. The SP value of a urethane resin is described in "POLYMER ENGINEERING AND SCIENCE JUNE, 1974, Vol. 14, No. 6, ROBERT F. FEDORS (p. 472)".

From the viewpoint of improvement in mechanical properties (elongation and tensile strength) of a urethane resin molded body, the ($R^3H$) is preferably a hydroxyl group-containing compound, an amino group-containing compound, AO adducts of these, and a polyester compound obtained by a condensation reaction of an active hydrogen-containing compound with a polycarboxylic acid, further preferably methanol, ethanol, butanol, ethylene glycol, propylene glycol, glycerol, pentaerythritol, sorbitol, sucrose, benzyl alcohol, phenol, methylamine, dimethylamine, ethylamine, diethylamine, butylamine, dibutylamine, phenylamine, diphenylamine, EO and/or PO adduct(s) of these, condensates of these active hydrogen compounds with phthalic acid and/or isophthalic acid, and monochlorides preferred of which is benzyl chloride.

The urethane or urethane-urea resin (U2) is obtained by reacting an active hydrogen component (A) with an isocyanate component (B). Examples of the active hydrogen component (A) include a polyester diol (A1), a polyether diol (A2), and a polyetherester diol (A3). Specific examples of these are the same as those of the (U1). The isocyanate component (B) is the same as those exemplified in the (U1).

The urethane or urethane-urea resin (U2) is obtained by reacting the active hydrogen component (A) with the isocyanate component (B), and further with a low-molecular weight diamine or low-molecular weight diol (K).

Specific examples of the low-molecular weight diamine or low-molecular weight diol (K) are the same as those of the (U1).

Examples of a method for adjusting the molecular weight of the urethane or urethane-urea resin (U2) and a method for producing the urethane or urethane-urea resin (U2) include the same as those of the (U1).

The melt viscosity of the (U2) at 190° C. and the storage modulus G' thereof at 130° C. are the same as those of the (U1).

The urethane resin composition (S2) contains the compound (E) represented by the general formula (1) and the urethane or urethane-urea resin (U2).

The content of the compound (E) is preferably 0.1 to 10% by weight based on the weight of the urethane or urethane-urea resin (U2).

An additive (F) mentioned later can be contained in the urethane resin composition (S2).

In preparing the urethane resin composition (S2), the compound (E) and the additive (F) may be added to the active hydrogen component (A), added during the production step of the urethane prepolymer (G), or added to the obtained (G).

The urethane or urethane-urea resin (U1) or (U2) is preferably a thermoplastic resin.

When the (U1) or the (U2) is made into particles, it is applicable to powder for slush molding, as well as a hot melt adhesive and the like. Examples of the urethane resin particles (D1) or (D2) [hereinbelow, may be described as urethane resin particles (D)] include particles obtained by the following production methods.

(1) The urethane resin particles (D) can be produced by a method of allowing an active hydrogen component (A) in which a mixture of a polyester diol (A1) and an active hydrogen-containing compound (C) represented by the general formula (3) is contained beforehand to react with a diisocyanate component (B) so that the ratio by mole of hydroxyl groups of the active hydrogen component (A) to isocyanate groups of the diisocyanate component (B) is set to 1:1.2 to 1:4.0, and allowing a urethane prepolymer (G) having isocyanate groups at the end thereof to undergo an extension reaction with a low-molecular weight diamine or low-molecular weight diol (K) in the presence of water and a dispersion stabilizer.

The low-molecular weight diamine may be a blocked linear aliphatic diamine (H1) (e.g., a ketimine compound) or the like.

(2) The urethane resin particles (D) can be produced by a method of allowing the above-described urethane prepolymer (G) to undergo an extension reaction with the low-molecular weight diamine or low-molecular weight diol (K) in the presence of a non-polar organic solvent and a dispersion stabilizer.

(3) The urethane resin particles (D) can be produced by a method of allowing the diisocyanate component (B), the high-molecular weight diol (A), and the low-molecular weight diol or low-molecular weight diamine (K) to react with one another to obtain lumps of a thermoplastic polyurethane resin, and then making the lumps into powder (e.g., a freeze-pulverizing method, or a method in which the lumps are melted, the melted substance is passed through fine holes, and then the resultant is cut).

The volume-average particle diameter of the urethane resin particles (D) of the present invention is preferably 10 to 500 µm, more preferably within the range of 70 to 300 µm.

Besides the urethane or urethane-urea resin (U1) or (U2) and the compound (E), an additive (F) can be added to the urethane resin particles (D) of the present invention to make the mixture into a thermoplastic urethane resin particle composition (P) for slush molding. Examples of the additive (F) include an inorganic filler, a pigment, a plasticizer, a releasing agent, an organic filler, a blocking inhibitor, a stabilizer, a dispersing agent, and the like.

The addition amount (% by weight) of the additive (F) is preferably 0 to 50, and more preferably 1 to 30 based on the weight of the urethane or urethane-urea resin (U1) or the total weight of the (U2) and the (E).

The additive (F) may be added to the active hydrogen component (A), added during the production step of the urethane prepolymer (G), or added to the obtained (G).

In the case where the additive (F) is a plasticizer, a releasing agent, a fluidity modifier, or a blocking inhibitor, it is preferable to use a method of impregnating these additives into powder composed of the urethane resin particles (D), or mixing them.

Examples of the inorganic filler include kaolin, talc, silica, titanium oxide, calcium carbonate, bentonite, mica, sericite, glass flake, glass fiber, graphite, magnesium hydroxide, aluminum hydroxide, antimony trioxide, barium sulfate, zinc borate, alumina, magnesia, wollastonite, xonotlite, whisker, metal powder, and the like. Among these, kaolin, talc, silica, titanium oxide, and calcium carbonate are preferable, and kaolin and talc are more preferable, from the viewpoint of promotion of the crystallization of the thermoplastic resin.

The volume-average particle diameter (µm) of the inorganic filler is preferably 0.1 to 30, more preferably 1 to 20, and particularly preferably 5 to 10, from the viewpoint of dispersibility in the thermoplastic resin.

The addition amount (% by weight) of the inorganic filler is preferably 0 to 40, and more preferably 1 to 20 based on the weight of the urethane or urethane-urea resin (U1) or the total weight of the (U2) and the (E).

The pigment is not particularly limited, and a known organic pigment and/or inorganic pigment may be used. The pigment is blended in an amount of usually 10 parts by weight or less, and preferably 0.01 to 5 parts by weight based on 100 parts by weight of the (U). Examples of the organic pigment include insoluble or soluble azo pigments, copper phthalocyanine-based pigments, quinacridone-based pigments, and the like. Examples of the inorganic pigment include chromates, ferrocyan compounds, metal oxides (titanium oxide, iron oxide, zinc oxide, aluminum oxide, etc.), metal salts [sulfates (barium sulfate, etc.), silicates (calcium silicate, magnesium silicate, etc.), carbonates (calcium carbonate, magnesium carbonate, etc.), phosphates (calcium phosphate, magnesium phosphate, etc.) etc.], metal powder (aluminum powder, iron powder, nickel powder, copper powder, etc.), carbon black, and the like. The average particle diameter of the pigment is not particularly limited, and is usually 0.2 to 5.0 µm, and preferably 0.5 to 1 µm.

The addition amount (% by weight) of the pigment is preferably 0 to 5, and more preferably 1 to 3 based on the weight of the urethane or urethane-urea resin (U1) or the total weight of the (U2) and the (E).

Examples of the plasticizer include phthalic acid esters (dibutyl phthalate, dioctyl phthalate, dibutylbenzyl phthalate, diisodecyl phthalate, etc.); aliphatic dibasic acid esters (di-2-ethylhexyl adipate, 2-ethylhexyl sebacate, etc.); trimellitic acid esters (tri-2-ethylhexyl trimellitate, trioctyl trimellitate, etc.); aliphatic acid esters (butyl oleate, etc.); aliphatic esters of phosphoric acid (trimethyl phosphate, triethyl phosphate, tributyl phosphate, tri-2-ethylhexyl phosphate, tributoxy phosphate, etc.); aromatic esters of phosphoric acid (triphenyl phosphate, tricresyl phosphate, trixylenyl phosphate, cresyldiphenyl phosphate, xylenyldiphenyl phosphate, 2-ethylhexyldiphenyl phosphate, tris(2,6-dimethylphenyl)phosphate, etc.); halogenated aliphatic esters of phosphoric acid (tris(chloroethyl)phosphate, tris(β-chloropropyl)phosphate, tris(dichloropropyl)phosphate, tris(tribromoneopentyl)phosphate, etc.); and a mixture of two or more kinds of these.

The addition amount (% by weight) of the plasticizer is preferably 0 to 50, and more preferably 5 to 20 based on the weight of the urethane or urethane-urea resin (U1) or the total weight of the (U2) and the (E).

The releasing agent may be a known releasing agent or the like. Examples thereof include fluorine compound-releasing agents (triperfluoroalkyl (the carbon number is 8 to 20) esters of phosphoric acid, e.g., triperfluorooctyl phosphate, triperfluorododecyl phosphate, etc.); silicone compound-releasing agents (dimethylpolysiloxane, amino-modified dimethylpolysiloxane, carboxyl-modified dimethylpolysiloxane, etc.); aliphatic acid ester-releasing agents (mono or polyhydric alcohol esters of an aliphatic acid having a carbon number of 10 to 24, e.g., butyl stearate, hardened castor oil, ethylene glycol monostearate, etc.); aliphatic acid amide-releasing agents (mono or bisamides of an aliphatic acid having a carbon number of 8 to 24, e.g., oleic amide, palmitic amide, stearic amide, distearic amide of ethylenediamine, etc.); metal soap (magnesium stearate, zinc stearate, etc.); natural or synthetic waxes (paraffin wax, microcrystalline wax, polyethylene wax, polypropylene wax, etc.); a mixture of two or more kinds of these, and the like.

The addition amount (% by weight) of the releasing agent is preferably 0 to 1, and more preferably 0.1 to 0.5 based on the weight of the urethane or urethane-urea resin (U1) or the total weight of the (U2) and the (E).

The stabilizer may be a compound having, in the molecule thereof, a carbon-carbon double bond (an ethylene bond which may have a substituent, etc.) (provided that this double bond is not any double bond in the aromatic ring(s) thereof) or a carbon-carbon triple bond (an acetylene bond which may have a substituent), or the like. Examples thereof include esters of (meth)acrylic acid and a polyhydric alcohol (a di to decahydric polyhydric alcohol; the same applies hereinbelow) (ethylene glycol di(meth)acrylate, trimethylolpropane tri(meth)acrylate, pentaerythritol tetra(meth)acrylate, dipentaerythritol tri(meth)acrylate, etc.); esters of (meth)allyl alcohol and a di- to hexavalent polycarboxylic acid (diallyl phthalate, trimellitic acid triallyl ester, etc.); poly(meth)allyl ethers of a polyhydric alcohol (pentaerythritol (meth)allyl ether, etc.); polyvinyl ethers of a polyhydric alcohol (ethylene glycol divinyl ether, etc.); polypropenyl ethers of a polyhydric alcohol (ethylene glycol dipropenyl ether, etc.); polyvinyl benzenes (divinyl benzene, etc.); a mixture of two or more kinds of these, and the like. Among these, from the viewpoint of stability (radical polymerization rate), esters of (meth)acrylic acid and a polyhydric alcohol are preferable, and trimethylolpropane tri(meth)acrylate, pentaerythritol tetra(meth)acrylate, and dipentaerythritol penta(meth)acrylate are more preferable.

The addition amount (% by weight) of the stabilizer is preferably 0 to 20, and more preferably 1 to 15 based on the weight of the urethane or urethane-urea resin (U1) or the total weight of the (U2) and the (E).

In the thermoplastic polyurethane resin particle composition (P) [hereinbelow, described as resin particle composition (P)] for slush molding of the present invention, a known inorganic blocking inhibitor, organic blocking inhibitor, or the like may be used as a powder fluidity improver or a blocking inhibitor. Examples of the inorganic blocking inhibitor include silica, talc, titanium oxide, calcium carbonate, and the like. Examples of the organic blocking inhibitor include thermosetting resins (thermosetting polyurethane resin, guanamine-based resin, epoxy-based resin, etc.) having a particle diameter of 10 μm or less; thermoplastic resins (thermoplastic polyurethane urea resin, poly(meth)acrylate resin, etc.) having a particle diameter of 10 μm or less, and the like.

The addition amount (% by weight) of the blocking inhibitor (fluidity improver) is preferably 0 to 5, and more preferably 0.5 to 1 based on the weight of the urethane or urethane-urea resin (U1) or the total weight of the (U2) and the (E).

A mixing device used when the resin particle composition (P) is produced by mixing as described above may be a known powder mixing device, and may be any one of a container-rotating type mixer, a container-fixed type mixer, and a fluid-motion type mixer. A method of dry-blending these components is well known which uses, for example, the container-fixed type mixer such as a high-speed flowing-type mixer, a biaxial paddle type mixer, a high-speed shearing mixer (a Henschel Mixer (registered trademark), etc.), a low-speed mixer (a planetary mixer, etc.), or a cone-shaped screw mixer (a Nauta Mixer (registered trademark), etc.). Among these methods, it is preferred to use a biaxial paddle type mixer, a low-speed mixer (a planetary mixer, etc.), and a cone-shaped screw mixer (a Nauta Mixer (registered trademark; this note is omitted hereinbelow), etc.).

The volume-average particle diameter of the resin particle composition (P) is preferably 10 to 500 μm, and more preferably in the range of 70 to 300 μm.

The resin particle composition (P) may be molded by, for example, a slush molding method to produce a urethane resin molded body such as a skin body. An examples of the slush molding method may include a method of vibrating/rotating a heated mold together with a box in which the powder composition of the present invention is put, to melt and fluidize the powder inside the mold, followed by cooling and solidification to produce a skin body.

The temperature of the mold is preferably 200 to 300° C., and more preferably 200 to 250° C.

The thickness of the skin body molded from the resin particle composition (P) is preferably 0.3 to 1.5 mm.

The resin particle composition (P) can be molded in the range of relatively low temperatures. The temperature for the molding may be 200 to 250° C.

A resin molded product can be obtained by setting the molded skin body onto a foam mold to bring the front surface of the body into contact with the mold, and then allowing a urethane foam to flow thereinto, thereby forming a foamed layer having a thickness of 5 mm to 15 mm onto the rear surface.

The resin molded product molded from the resin particle composition (P) is suitable for interior materials of an automobile, for example, an instrument panel and a door trim.

The melt viscosity of the resin particle composition (P) at 190° C. is preferably 100 to 500 Pa·s, and more preferably 100 to 300 Pa·s.

When the melt viscosity of the resin particle composition (P) at 190° C. is 500 Pa·s or less, the low-temperature meltability of the resin particle composition is good.

The storage modulus G' of the molded body molded from the resin particle composition (P) at 130° C. is preferably 0.1 to 5 MPa, and more preferably 0.25 to 1 MPa, so as to be used for slush molding.

When the storage modulus G' of the above-described molded body at 130° C. is 0.1 MPa or more, the heat resistance is good. When it is 5 MPa or less, the low-temperature meltability of the resin particle composition (P) is good.

EXAMPLES

Hereinafter, the present invention will be further described by way of examples; however, the present invention is not limited to these. In the following description, "part(s)" represents part(s) by weight and "%" represents % by weight.

Production Example 1

Production of MEK Ketimine Compound of Diamine

While refluxing hexamethylenediamine and excessive amount of MEK (methyl ethyl ketone, 4 times in mole relative to the amount of the diamine) at 80° C. for 24 hours, water generated was removed to the outside of the system. Then, under a reduced pressure, unreacted MEK was removed to obtain an MEK ketimine compound.

Production Example 2

Production of Active Hydrogen-Containing Compound (C-1)

Into a reaction vessel equipped with a condenser tube, a stirrer and a nitrogen-inlet tube were charged 192 parts of trimellitic anhydride and 216 parts of benzyl alcohol, and a reaction was carried out for 5 hours at 180° C. removing generated water. Then, 62 parts of ethylene glycol was added and the reaction was carried out for 5 hours at 140° C. removing generated water, and an active hydrogen-containing compound (C-1) was taken out. The hydroxyl value of the obtained active hydrogen-containing compound (C-1) was measured and the molecular weight was calculated to be 434. The structure of the (C-1) {a and b in the general formula (3)} are listed in Table 1 and Table 2. The data of the following (C-2) to (C-8) are also listed in Table 1 and Table 2.

Production Example 3

Production of Active Hydrogen-Containing Compound (C-2)

Into a reaction vessel equipped with a condenser tube, a stirrer and a nitrogen-inlet tube were charged 192 parts of trimellitic anhydride and 108 parts of benzyl alcohol, and a reaction was carried out for 5 hours at 180° C. removing generated water. Then, 124 parts of ethylene glycol was added and the reaction was carried out for 5 hours at 140° C. removing generated water and an active hydrogen-containing compound (C-2) was taken out. The hydroxyl value of the obtained active hydrogen-containing compound (C-2) was measured and the molecular weight was calculated to be 388.

Production Example 4

Production of Active Hydrogen-Containing Compound (C-3)

Into a reaction vessel equipped with a condenser tube, a stirrer and a nitrogen-inlet tube were charged 192 parts of trimellitic anhydride and 186 parts of ethylene glycol, and a reaction was carried out for 5 hours at 140° C. removing generated water and an active hydrogen-containing compound (C-3) was taken out. The hydroxyl value of the obtained active hydrogen-containing compound (C-3) was measured and the molecular weight was calculated to be 342.

Production Example 5

Production of Active Hydrogen-Containing Compound (C-4)

Into a reaction vessel equipped with a condenser tube, a stirrer and a nitrogen-inlet tube were charged 254 parts of pyromellitic dianhydride and 248 parts of ethylene glycol, and a reaction was carried out for 5 hours at 140° C. removing generated water and an active hydrogen-containing compound (C-4) was taken out. The hydroxyl value of the obtained active hydrogen-containing compound (C-4) was measured and the molecular weight was calculated to be 430.

Production Example 6

Production of Active Hydrogen-Containing Compound (C-5)

Into a reaction vessel equipped with a condenser tube, a stirrer and a nitrogen-inlet tube were charged 192 parts of trimellitic anhydride and 108 parts of benzyl alcohol, and a reaction was carried out for 5 hours at 180° C. removing generated water. Then, a reaction product of 1 mol of 1,2,4-benzenetricarboxylic acid with 1 mol of benzyl alcohol was taken out. The reaction product was placed in an autoclave reactor, then 59 parts of PO was reacted at 120° C. for 3 hours in the autoclave reactor and an active hydrogen-containing compound (C-5) was taken out. The hydroxyl value of the obtained active hydrogen-containing compound (C-5) was measured and the molecular weight was calculated to be 416.

Production Example 7

Production of Active Hydrogen-Containing Compound (C-6)

Into a reaction vessel equipped with a condenser tube, a stirrer and a nitrogen-inlet tube were charged 192 parts of trimellitic anhydride and 186 parts of dodecyl alcohol, and a reaction was carried out for 5 hours at 180° C. removing generated water. Then, 124 parts of ethylene glycol was added and the reaction was carried out for 5 hours at 140° C. removing generated water and an active hydrogen-containing compound (C-6) was taken out. The hydroxyl value of the obtained active hydrogen-containing compound (C-6) was measured and the molecular weight was calculated to be 466.

Production Example 8

Production of Active Hydrogen-Containing Compound (C-7)

After charging 384 parts of ethyl acetate into a reaction vessel equipped with a condenser tube, a stirrer and a nitrogen-inlet tube, thereto were added 192 parts of trimellitic anhydride, 62 parts of ethylene glycol and 202 parts of triethyl amine, and a reaction was carried out for 2 hours at 80° C. Then thereto was added 252 parts of benzyl chloride and the reaction was carried out for 2 hours at 70° C. After the reaction, a separation of the layers and a solvent removal were performed and an active hydrogen-containing compound (C-7) was taken out. The hydroxyl value of the obtained active hydrogen-containing compound (C-7) was measured and the molecular weight was calculated to be 434.

Production Example 9

Production of Active Hydrogen-Containing Compound (C-8)

Into a reaction vessel equipped with a condenser tube, a stirrer and a nitrogen-inlet tube were added 192 parts of trimellitic anhydride and 60 parts of ethylene diamine, and a reaction was carried out for 2 hours at 80° C. Then thereto was added 216 parts of benzyl alcohol and the reaction was carried out for 5 hours at 180° C. removing generated water, and an active hydrogen-containing compound (C-8) was taken out. The amine value of the obtained active hydrogen-containing compound (C-8) was measured and the molecular weight was calculated to be 432.

Production Example 10

Production of Compound (E-1)

Into a reaction vessel equipped with a condenser tube, a stirrer and a nitrogen-inlet tube were charged 384 parts of trimellitic anhydride and 174 parts of 1,10-decanediol, and a reaction was carried out for 5 hours at 140° C. Thereto was added 432 parts of benzyl alcohol and the reaction was carried out for 5 hours at 180° C. removing generated water and a compound (E-1) was taken out. The structure of (E-1) {$R^3$, V, W, c and m in the general formula (1)} are listed in Table 2. The data of the following (E-2) to (E-7) are also listed in Table 2.

Production Example 11

Production of Compound (E-2)

Into a reaction vessel equipped with a condenser tube, a stirrer and a nitrogen-inlet tube were charged 384 parts of trimellitic anhydride and 62 parts of ethylene glycol, and a reaction was carried out for 5 hours at 140° C. Thereto was added 432 parts of benzyl alcohol and the reaction was carried out for 5 hours at 180° C. removing generated water and a compound (E-2) was taken out.

Production Example 12

Production of Compound (E-3)

Into a reaction vessel equipped with a condenser tube, a stirrer and a nitrogen-inlet tube were charged 508 parts of pyromellitic dianhydride and 174 parts of 1,10-decanediol, and a reaction was carried out for 5 hours at 140° C. Thereto was added 648 parts of benzyl alcohol and the reaction was carried out for 5 hours at 180° C. removing generated water and a compound (E-3) was taken out.

Production Example 13

Production of Compound (E-4)

Into a reaction vessel equipped with a condenser tube, a stirrer and a nitrogen-inlet tube were charged 384 parts of trimellitic anhydride and 174 parts of 1,10-decanediol, and a reaction was carried out for 5 hours at 140° C. Thereto was added 428 parts of benzyl amine and the reaction was carried out for 5 hours at 180° C. removing generated water and a compound (E-4) was taken out.

Production Example 14

Production of Compound (E-5)

Into a reaction vessel equipped with a condenser tube, a stirrer and a nitrogen-inlet tube were charged 576 parts of trimellitic anhydride and 92 parts of glycerol, and a reaction was carried out for 5 hours at 140° C. Thereto was added 648 parts of benzyl alcohol and the reaction was carried out for 5 hours at 180° C. removing generated water and a compound (E-5) was taken out.

Production Example 15

Production of Compound (E-6)

Into a reaction vessel equipped with a condenser tube, a stirrer and a nitrogen-inlet tube were charged 768 parts of trimellitic anhydride and 136 parts of pentaerythritol, and a reaction was carried out for 5 hours at 140° C. Thereto was added 864 parts of benzyl alcohol and the reaction was carried out for 5 hours at 180° C. removing generated water and a compound (E-6) was taken out.

Production Example 16

Production of Compound (E-7)

Into a reaction vessel equipped with a condenser tube, a stirrer and a nitrogen-inlet tube were charged 1536 parts of trimellitic anhydride and 342 parts of sucrose, and a reaction was carried out for 5 hours at 140° C. Thereto was added 1728 parts of benzyl alcohol and the reaction was carried out for 5 hours at 180° C. removing generated water and a compound (E-7) was taken out.

Production Example 17

Production of Prepolymer Solution (G-1)

Into a reaction vessel equipped with a thermometer, a stirrer and a nitrogen-inlet tube were charged polyethylene isophthalate diol having a molecular weight calculated from its hydroxyl value (hereinafter, referred to as Mn) of 2300 (278.1 parts), polybutylene adipate diol having an Mn of 1000 (417.2 parts), the active hydrogen-containing compound (C-1) (16.0 parts) and benzyl alcohol (5.3 parts), and after the system was purged with nitrogen, the mixture was heated to 110° C. under stirring to be melted and cooled to 50° C.

Subsequently, methyl ethyl ketone (150.0 parts) and hexamethylene diisocyanate (132.0 parts) were added and a reaction was carried out for 6 hours at 90° C. Next, after cooling to 70° C., a stabilizer (1.4 parts) [Irganox 1010 manufactured by Ciba Specialty Chemicals, Co., Ltd.] and a carbon black (1 part) were added and mixed uniformly to obtain a prepolymer solution (G-1). The NCO content of the obtained prepolymer solution was 1.63%.

Production Example 18

Production of Prepolymer Solution (G-2)

Into a reaction vessel equipped with a thermometer, a stirrer and a nitrogen-inlet tube were charged polyethylene isophthalate diol having an Mn of 2300 (281.8 parts), polybutylene adipate diol having an Mn of 1000 (422.7 parts), the active hydrogen-containing compound (C-1) (4.0 parts) and benzyl alcohol (8.2 parts), and after the system was purged with nitrogen, the mixture was heated to 110° C. under stirring to be melted and cooled to 50° C. Subsequently, methyl ethyl ketone (150.0 parts) and hexamethylene diisocyanate (131.9 parts) were added and a reaction was carried out for 6 hours at 90° C. Next, after cooling to 70° C., a stabilizer (1.4 parts) [Irganox 1010 manufactured by Ciba Specialty Chemicals, Co., Ltd.] and a carbon black (1 part) were added and mixed uniformly to obtain a prepolymer solution (G-2). The NCO content of the obtained prepolymer solution was 1.63%.

Production Example 19

Production of Prepolymer Solution (G-3)

Into a reaction vessel equipped with a thermometer, a stirrer and a nitrogen-inlet tube were charged polyethylene isophthalate diol having an Mn of 2300 (271.3 parts), polybutylene adipate diol having an Mn of 1000 (406.9 parts) and the active hydrogen-containing compound (C-1) (38.1 parts), and after the system was purged with nitrogen, the mixture was heated to 110° C. under stirring to be melted and cooled to 50° C. Subsequently, methyl ethyl ketone (150.0 parts) and hexamethylene diisocyanate (132.4 parts) were added and a reaction was carried out for 6 hours at 90° C. Next, after cooling to 70° C., a stabilizer (1.4 parts) [Irganox 1010 manufactured by Ciba Specialty Chemicals, Co., Ltd.] and a carbon black (1 part) were added and mixed uniformly to obtain a prepolymer solution (G-3). The NCO content of the obtained prepolymer solution was 1.63%.

Production Example 20

Production of Prepolymer Solution (G-4)

Into a reaction vessel equipped with a thermometer, a stirrer and a nitrogen-inlet tube were charged polyethylene isophthalate diol having an Mn of 2300 (281.2 parts), polybutylene adipate diol having an Mn of 1000 (421.8 parts), the active hydrogen-containing compound (C-2) (3.5 parts) and benzyl alcohol (9.2 parts), and after the system was purged with nitrogen, the mixture was heated to 110° C. under stirring to be melted and cooled to 50° C. Subsequently, methyl ethyl ketone (150.0 parts) and hexamethylene diisocyanate (132.9 parts) were added and a reaction was carried out for 6 hours at 90° C. Next, after cooling to 70° C., a stabilizer (1.4 parts) [Irganox 1010 manufactured by Ciba Specialty Chemicals, Co., Ltd.] and a carbon black (1 part) were added and mixed uniformly to obtain a prepolymer solution (G-4). The NCO content of the obtained prepolymer solution was 1.63%.

Production Example 21

Production of Prepolymer Solution (G-5)

Into a reaction vessel equipped with a thermometer, a stirrer and a nitrogen-inlet tube were charged polyethylene isophthalate diol having an Mn of 2300 (192.7 parts), polybutylene adipate diol having an Mn of 1000 (289.0 parts), the active hydrogen-containing compound (C-2) (178.2 parts) and benzyl alcohol (9.2 parts), and after the system was purged with nitrogen, the mixture was heated to 110° C. under stirring to be melted and cooled to 50° C. Subsequently, methyl ethyl ketone (150.0 parts) and hexamethylene diisocyanate (179.6 parts) were added and a reaction was carried out for 6 hours at 90° C. Next, after cooling to 70° C., a stabilizer (1.4 parts) [Irganox 1010 manufactured by Ciba Specialty Chemicals, Co., Ltd.] and a carbon black (1 part) were added and mixed uniformly to obtain a prepolymer solution (G-5). The NCO content of the obtained prepolymer solution was 1.63%.

Production Example 22

Production of Prepolymer Solution (G-6)

Into a reaction vessel equipped with a thermometer, a stirrer and a nitrogen-inlet tube were charged polyethylene isophthalate diol having an Mn of 2300 (282.5 parts), polybutylene adipate diol having an Mn of 1000 (423.7 parts), the active hydrogen-containing compound (C-3) (0.7 parts) and benzyl alcohol (9.2 parts), and after the system was purged with nitrogen, the mixture was heated to 110° C. under stirring to be melted and cooled to 50° C. Subsequently, methyl ethyl ketone (150.0 parts) and hexamethylene diisocyanate (132.5 parts) were added and a reaction was carried out for 6 hours at 90° C. Next, after cooling to 70° C., a stabilizer (1.4 parts) [Irganox 1010 manufactured by Ciba Specialty Chemicals, Co., Ltd.] and a carbon black (1 part) were added and mixed uniformly to obtain a prepolymer solution (G-6). The NCO content of the obtained prepolymer solution was 1.63%.

Production Example 23

Production of Prepolymer Solution (G-7)

Into a reaction vessel equipped with a thermometer, a stirrer and a nitrogen-inlet tube were charged polyethylene isophthalate diol having an Mn of 2300 (273.1 parts), polybutylene adipate diol having an Mn of 1000 (409.7 parts), the active hydrogen-containing compound (C-4) (0.45 part) and benzyl alcohol (13.07 parts), and after the system was purged with nitrogen, the mixture was heated to 110° C. under stirring to be melted and cooled to 50° C. Subsequently, methyl ethyl ketone (150.0 parts) and hexamethylene diisocyanate (140.9 parts) were added and a reaction was carried out for 6 hours at 90° C. Next, after cooling to 70° C., a stabilizer (1.4 parts) [Irganox 1010 manufactured by Ciba Specialty Chemicals, Co., Ltd.] and a carbon black (1 part) were added and mixed uniformly to obtain a prepolymer solution (G-7). The NCO content of the obtained prepolymer solution was 1.63%.

Production Example 24

Production of Prepolymer Solution (G-8)

Into a reaction vessel equipped with a thermometer, a stirrer and a nitrogen-inlet tube were charged polyethylene isophthalate diol having an Mn of 2300 (264.9 parts), polybutylene adipate diol having an Mn of 1000 (397.3 parts), the active hydrogen-containing compound (C-5) (36.4 parts) and benzyl alcohol (9.3 parts), and after the system was purged with nitrogen, the mixture was heated to 110° C. under stirring to be melted and cooled to 50° C. Subsequently, methyl ethyl ketone (150.0 parts) and hexamethylene diisocyanate (140.7 parts) were added and a reaction was carried out for 6 hours at 90° C. Next, after cooling to 70° C., a stabilizer (1.4 parts) [Irganox 1010 manufactured by Ciba Specialty Chemicals, Co., Ltd.] and a carbon black (1 part) were added and mixed uniformly to obtain a prepolymer solution (G-8). The NCO content of the obtained prepolymer solution was 1.63%.

Production Example 25

Production of Prepolymer Solution (G-9)

Into a reaction vessel equipped with a thermometer, a stirrer and a nitrogen-inlet tube were charged polyethylene isophthalate diol having an Mn of 2300 (265.5 parts), polybutylene adipate diol having an Mn of 1000 (398.2 parts), the active hydrogen-containing compound (C-6) (36.5 parts) and benzyl alcohol (9.2 parts), and after the system was purged with nitrogen, the mixture was heated to 110° C. under stirring to be melted and cooled to 50° C. Subsequently, methyl ethyl ketone (150.0 parts) and hexamethylene diisocyanate (139.2 parts) were added and a reaction was carried out for 6 hours at 90° C. Next, after cooling to 70° C., a stabilizer (1.4 parts) [Irganox 1010 manufactured by Ciba Specialty Chemicals, Co., Ltd.] and a carbon black (1 part) were added and mixed uniformly to obtain a prepolymer solution (G-9). The NCO content of the obtained prepolymer solution was 1.63%.

Production Example 26

Production of Prepolymer Solution (G-10)

Into a reaction vessel equipped with a thermometer, a stirrer and a nitrogen-inlet tube were charged polyethylene isophthalate diol having an Mn of 2300 (93.1 parts), polybutylene adipate diol having an Mn of 1000 (349.6 parts), the active hydrogen-containing compound (C-7) (6.0 parts) and benzyl alcohol (5.3 parts), and after the system was purged with nitrogen, the mixture was heated to 110° C. under stirring to be melted and cooled to 50° C. Subsequently, methyl ethyl ketone (400.3 parts), hexamethylene diisocyanate (112.9 parts) and isophorone diisocyanate (3.8 parts) were added and a reaction was carried out for 6 hours at 90° C. Next, after cooling to 70° C., a stabilizer (2.7 parts) [Irganox 1010 manufactured by Ciba Specialty Chemicals, Co., Ltd.] and a carbon black (1 part) were added and mixed uniformly to obtain a prepolymer solution (G-10). The NCO content of the obtained prepolymer solution was 1.26%.

Production Example 27

Production of Prepolymer Solution (G-11)

Into a reaction vessel equipped with a thermometer, a stirrer and a nitrogen-inlet tube were charged polyethylene isophthalate diol having an Mn of 2300 (92.1 parts), polybutylene adipate diol having an Mn of 1000 (338.5 parts), the active hydrogen-containing compound (C-7) (30.7 parts) and benzyl alcohol (0.45 part), and after the system was purged with nitrogen, the mixture was heated to 110° C. under stirring to be melted and cooled to 50° C. Subsequently, methyl ethyl ketone (396.1 parts), hexamethylene diisocyanate (110.0 parts) and isophorone diisocyanate (3.7 parts) were added and a reaction was carried out for 6 hours at 90° C. Next, after cooling to 70° C., a stabilizer (2.7 parts) [Irganox 1010 manufactured by Ciba Specialty Chemicals, Co., Ltd.] and a carbon black (1 part) were added and mixed uniformly to obtain a prepolymer solution (G-11). The NCO content of the obtained prepolymer solution was 1.26%.

Production Example 28

Production of Prepolymer Solution (G-12)

Into a reaction vessel equipped with a thermometer, a stirrer and a nitrogen-inlet tube were charged polyethylene isophthalate diol having an Mn of 2300 (92.1 parts), polybutylene adipate diol having an Mn of 1000 (338.5 parts), the active hydrogen-containing compound (C-8) (30.6 parts) and benzyl alcohol (0.45 part), and after the system was purged with nitrogen, the mixture was heated to 110° C. under stirring to be melted and cooled to 50° C. Subsequently, methyl ethyl ketone (396.1 parts), hexamethylene diisocyanate (110.0 parts) and isophorone diisocyanate (3.7 parts) were added and a reaction was carried out for 6 hours at 90° C. Next, after cooling to 70° C., a stabilizer (2.7 parts) [Irganox 1010 manufactured by Ciba Specialty Chemicals, Co., Ltd.] and a carbon black (1 part) were added and mixed uniformly to obtain a prepolymer solution (G-12). The NCO content of the obtained prepolymer solution was 1.26%.

Production Example 29

Production of Prepolymer Solution (G-13)

Into a reaction vessel equipped with a thermometer, a stirrer and a nitrogen-inlet tube were charged polyethylene isophthalate diol having an Mn of 2300 (282.9 parts), polybutylene adipate diol having an Mn of 1000 (424.4 parts) and benzyl alcohol (9.34 parts), and after the system was purged with nitrogen, the mixture was heated to 110° C. under stirring to be melted and cooled to 50° C. Subsequently, methyl ethyl ketone (150.0 parts) and hexamethylene diisocyanate (132.0 parts) were added and a reaction was carried out for 6 hours at 90° C. Next, after cooling to 70° C., a stabilizer (1.4 parts) [Irganox 1010 manufactured by Ciba Specialty Chemicals, Co., Ltd.] and a carbon black (1 part) were added and mixed uniformly to obtain a prepolymer solution (G-13). The NCO content of the obtained prepolymer solution was 1.63%.

Comparative Production Example 1

Production of Comparative Active Hydrogen-Containing Compound (C-1')

Into a reaction vessel equipped with a condenser tube, a stirrer and a nitrogen-inlet tube were charged 148 parts (1 mol) of phthalic anhydride, 108 parts (1 mol) of benzyl alcohol and 62 parts (1 mol) of ethylene glycol, and a reaction was carried out for 5 hours at 180° C. removing generated water, and a compound (C-1') was taken out. The comparative active hydrogen-containing compound (C-1') is a mono ethylene glycol-mono benzyl ester of phthalic acid.

Comparative Production Example 2

Production of Comparative Compound (E-1')

Into a reaction vessel equipped with a condenser tube, a stirrer and a nitrogen-inlet tube were charged 192 parts of trimellitic anhydride and 324 parts of benzyl alcohol, and a reaction was carried out for 5 hours at 180° C. removing generated water and a compound (E-1') was taken out. The compound (E-1') is a tribenzyl ester of trimellitic acid.

Comparative Production Example 3

Production of Comparative Compound (E-2')

Into a reaction vessel equipped with a condenser tube, a stirrer and a nitrogen-inlet tube were charged 296 parts (2 mols) of phthalic anhydride and 174 parts (1 mol) of 1,10-decanediol, and a reaction was carried out for 5 hours at 140° C. Then thereto was added 216 parts (2 mols) of benzyl alcohol and the reaction was carried out for 5 hours at 180° C. removing generated water and a compound (E-2') was taken out. The compound (E-2') is a dibenzyl ester of 1,10-decanediol diphthalate.

Comparative Production Example 4

Production of Prepolymer Solution (G-1')

Into a reaction vessel equipped with a thermometer, a stirrer and a nitrogen-inlet tube were charged polyethylene isophthalate diol having an Mn of 2300 (280.2 parts), polybutylene adipate diol having an Mn of 1000 (420.3 parts) and benzyl alcohol (9.25 parts), and after the system was purged with nitrogen, the mixture was heated to 110° C. under stirring to be melted and cooled to 50° C. Subsequently, methyl ethyl ketone (150.0 parts) and hexamethylene diisocyanate (138.9 parts) were added and a reaction was carried out for 6 hours at 90° C. Next, after cooling to 70° C., a stabilizer (1.4 parts) [Irganox 1010 manufactured by Ciba Specialty Chemicals, Co., Ltd.] and a carbon black (1 part) were added and mixed uniformly to obtain a prepolymer solution (G-1'). The NCO content of the obtained prepolymer solution was 2.03%.

Comparative Production Example 5

Production of Prepolymer Solution (G-2')

Into a reaction vessel equipped with a thermometer, a stirrer and a nitrogen-inlet tube were charged polyethylene isophthalate diol having a molecular weight calculated from its hydroxyl value (hereinafter, referred to as Mn) of 2300 (278.1 parts), polybutylene adipate diol having an Mn of 1000 (417.2 parts), the comparative active hydrogen-containing compound (C-1') (16.0 parts) and benzyl alcohol (3.5 parts), and after the system was purged with nitrogen, the mixture was heated to 110° C. under stirring to be melted and cooled to 50° C. Subsequently, methyl ethyl ketone (150.0 parts) and hexamethylene diisocyanate (132.0 parts) were added and a reaction was carried out for 6 hours at 90° C. Next, after cooling to 70° C., a stabilizer (1.4 parts) [Irganox 1010 manufactured by Ciba Specialty Chemicals, Co., Ltd.] and a carbon black (1 part) were added and mixed uniformly to obtain a prepolymer solution (G-2'). The NCO content of the obtained prepolymer solution was 1.63%.

Example 1

Production of Resin Particle Composition (P-1)

Into a reaction vessel were charged and mixed the prepolymer solution (G-1) obtained in Production Example 17 (100 parts) and the MEK ketimine compound obtained in the production example 1 (4.2 parts), and thereto was added 300 parts of an aqueous solution in which a polycarboxylic acid type anionic surfactant [Sansparl PS-8, manufactured by Sanyo Chemical Ind., Ltd.] (30 parts) was dissolved. Then an Ultra Disperser manufactured by YAMATO Scientific Co., Ltd. was used to mix these components at a rotation number of 6000 rpm for 1 minute. The mixture was transferred to a reaction vessel equipped with a thermometer, a stirrer and a nitrogen blowing tube. After the inside of the vessel was purged with nitrogen, the reaction was performed under stirring at 50° C. for 10 hours. After the reaction was completed, the resultant was separated by filtration and dried to produce urethane resin particles (D-1). The (D-1) had a number average molecular weight (hereinafter, referred to as Mn) of 20000 and a volume average particle diameter of 145 µm. The melt viscosity at 190° C. and the storage elastic modulus at 130° C. of (D-1) are listed in Table 1. The same applies also to the following Examples and Comparative Examples.

Next, into a 100 L Nauta Mixer were charged the thermoplastic urethane resin particles (D-1) (100 parts), dipentaerythritol pentaacrylate [DA600; manufactured by Sanyo Chemical Industries, Ltd.] (1.0 part), serving as a radically polymerizable unsaturated group containing compound, and bis(1,2,2,6,6-pentamethyl-4-pyperidyl) sebacate and methyl 1,2,2,6,6-pentamethyl-4-pyperidyl sebacate (mixture) [Trade name: TINUVIN 765 manufactured by Ciba Inc.] (0.3 part), serving as a UV stabilizer, and were impregnated at 70° C. for 4 hours. After the 4 hours of impregnation, 2 kinds of internal mold release agents, i.e., a dimethylpolysiloxane [KEI L45-1000 manufactured by Nippon Unicar Co., Ltd.] (0.06 part) and a carboxyl modified silicone [X-22-3710 manufactured by Shin-Etsu Chemical Co., Ltd.] (0.05 part) were added and mixed for 1 hour, then cooled to room temperature. Finally, a crosslinked polymethyl methacrylate [Ganz Pearl PM-030S, manufactured by Ganz Chemical Co., Ltd.] (0.5 part), serving as an anti-blocking agent, was charged and mixed to obtain a resin particle composition (P-1). The volume average particle diameter of the (P-1) was 148 µm. The melt viscosity at 190° C. and the storage elastic modulus at 130° C. of (P-1) are listed in Table 1. The same applies also to the following Examples and Comparative Examples.

Example 2

Production of Resin Particle Composition (P-2)

Urethane resin particles (D-2) were produced in the same manner as in Example 1, with the exception that the prepolymer solution (G-2) (100 parts) was used in place of the prepolymer solution (G-1) in Example 1. The (D-2) had an Mn of 20000 and a volume average particle diameter of 140 µm.

Furthermore, a resin particle composition (P-2) was obtained in the same manner as in Example 1, with the exception that the urethane resin particles (D-2) were used in place of the urethane resin particles (D-1) in Example 1. The (P-2) had a volume average particle diameter of 143 µm.

Example 3

Production of Resin Particle Composition (P-3)

Urethane resin particles (D-3) were produced in the same manner as in Example 1, with the exception that the prepolymer solution (G-3) (100 parts) was used in place of the prepolymer solution (G-1) in Example 1. The (D-3) had an Mn of 15000 and a volume average particle diameter of 148 µm.

Furthermore, a resin particle composition (P-3) was obtained in the same manner as in Example 1, with the exception that the urethane resin particles (D-3) were used in place of the urethane resin particles (D-1) in Example 1. The (P-3) had a volume average particle diameter of 150 μm.

Example 4

Production of Resin Particle Composition (P-4)

Urethane resin particles (D-4) were produced in the same manner as in Example 1, with the exception that the prepolymer solution (G-4) (100 parts) was used in place of the prepolymer solution (G-1) in Example 1. The (D-4) had an Mn of 20000 and a volume average particle diameter of 158 μm.

Furthermore, a resin particle composition (P-4) was obtained in the same manner as in Example 1, with the exception that the urethane resin particles (D-4) were used in place of the urethane resin particles (D-1) in Example 1. The (P-4) had a volume average particle diameter of 160 μm.

Example 5

Production of Resin Particle Composition (P-5)

Urethane resin particles (D-5) were produced in the same manner as in Example 1, with the exception that the prepolymer solution (G-5) (100 parts) was used in place of the prepolymer solution (G-1) in Example 1. The (D-5) had an Mn of 20000 and a volume average particle diameter of 152 μm.

Furthermore, a resin particle composition (P-5) was obtained in the same manner as in Example 1, with the exception that the urethane resin particles (D-5) were used in place of the urethane resin particles (D-1) in Example 1. The (P-5) had a volume average particle diameter of 154 μm.

Example 6

Production of Resin Particle Composition (P-6)

Urethane resin particles (D-6) were produced in the same manner as in Example 1, with the exception that the prepolymer solution (G-6) (100 parts) was used in place of the prepolymer solution (G-1) in Example 1. The (D-6) had an Mn of 22000 and a volume average particle diameter of 154 μm.

Furthermore, a resin particle composition (P-6) was obtained in the same manner as in Example 1, with the exception that the urethane resin particles (D-6) were used in place of the urethane resin particles (D-1) in Example 1. The (P-6) had a volume average particle diameter of 155 μm.

Example 7

Production of Resin Particle Composition (P-7)

Urethane resin particles (D-7) were produced in the same manner as in Example 1, with the exception that the prepolymer solution (G-7) (100 parts) was used in place of the prepolymer solution (G-1) in Example 1. The (D-7) had an Mn of 26000 and a volume average particle diameter of 146 μm.

Furthermore, a resin particle composition (P-7) was obtained in the same manner as in Example 1, with the exception that the urethane resin particles (D-7) were used in place of the urethane resin particles (D-1) in Example 1. The (P-7) had a volume average particle diameter of 148 μm.

Example 8

Production of Resin Particle Composition (P-8)

Urethane resin particles (D-8) were produced in the same manner as in Example 1, with the exception that the prepolymer solution (G-8) (100 parts) was used in place of the prepolymer solution (G-1) in Example 1. The (D-8) had an Mn of 20000 and a volume average particle diameter of 144 μm.

Furthermore, a resin particle composition (P-8) was obtained in the same manner as in Example 1, with the exception that the urethane resin particles (D-8) were used in place of the urethane resin particles (D-1) in Example 1. The (P-8) had a volume average particle diameter of 146 μm.

Example 9

Production of Resin Particle Composition (P-9)

Urethane resin particles (D-9) were produced in the same manner as in Example 1, with the exception that the prepolymer solution (G-9) (100 parts) was used in place of the prepolymer solution (G-1) in Example 1. The (D-9) had an Mn of 20000 and a volume average particle diameter of 145 μm.

Furthermore, a resin particle composition (P-9) was obtained in the same manner as in Example 1, with the exception that the urethane resin particles (D-9) were used in place of the urethane resin particles (D-1) in Example 1. The (P-9) had a volume average particle diameter of 148 μm.

Example 10

Production of Resin Particle Composition (P-10)

Urethane resin particles (D-10) were produced in the same manner as in Example 1, with the exception that the prepolymer solution (G-10) (100 parts) and MEK ketimine compound (3.2 parts) were used in place of the prepolymer solution (G-1) in example 1. The (D-10) had an Mn of 20000 and a volume average particle diameter of 145 μm.

Furthermore, a resin particle composition (P-10) was obtained in the same manner as in Example 1, with the exception that the urethane resin particles (D-10) were used in place of the urethane resin particles (D-1) in Example 1. The (P-10) had a volume average particle diameter of 148 μm.

Example 11

Production of Resin Particle Composition (P-11)

Urethane resin particles (D-11) were produced in the same manner as in Example 1, with the exception that the prepolymer solution (G-11) (100 parts) and MEK ketimine compound (3.2 parts) were used in place of the prepolymer solution (G-1) in Example 1. The (D-11) had an Mn of 20000 and a volume average particle diameter of 145 μm.

Furthermore, a resin particle composition (P-11) was obtained in the same manner as in Example 1, with the exception that the urethane resin particles (D-11) were used in place of the urethane resin particles (D-1) in Example 1. The (P-11) had a volume average particle diameter of 148 μm.

Example 12

Production of Resin Particle Composition (P-12)

Urethane resin particles (D-12) were produced in the same manner as in Example 1, with the exception that the prepolymer solution (G-12) (100 parts) and MEK ketimine compound (3.2 parts) were used in place of the prepolymer solution (G-1) in Example 1. The (D-12) had an Mn of 20000 and a volume average particle diameter of 150 μm.

Furthermore, a resin particle composition (P-12) was obtained in the same manner as in Example 1, with the exception that the urethane resin particles (D-12) were used in place of the urethane resin particles (D-1) in Example 1. The (P-12) had a volume average particle diameter of 152 μm.

Example 13

Production of Resin Particle Composition (P-13)

Urethane resin particles (D-13) were produced in the same manner as in Example 1, with the exception that the prepolymer solution (G-13) (100 parts) was used in place of the prepolymer solution (G-1) in Example 1. The (D-13) had an Mn of 20000 and a volume average particle diameter of 145 μm.

Next, into a 100 L Nauta Mixer were charged the urethane resin particles (D-13) (100 parts), dipentaerythritol pentaacrylate [DA600; manufactured by Sanyo Chemical Industries, Ltd.] (4.0 part), serving as a radically polymerizable unsaturated group containing compound, bis(1,2,2,6,6-pentamethyl-4-pyperidyl)sebacate and methyl 1,2,2,6,6-pentamethyl-4-pyperidyl sebacate (mixture) [Trade name: TINUVIN 765 manufactured by Ciba Inc.] (0.3 part), serving as a UV stabilizer and the compound (E-1) (2 parts), and were impregnated at 70° C. for 4 hours. After the 4 hours of impregnation, 2 kinds of internal mold release agents, i.e., a dimethylpolysiloxane [KEI L45-1000 manufactured by Nippon Unicar Co., Ltd.] (0.06 part) and a carboxyl modified silicone [X-22-3710 manufactured by Shin-Etsu Chemical Co., Ltd.] (0.05 part) were added and mixed for 1 hour, then cooled to room temperature. Finally, a crosslinked polymethyl methacrylate [Ganz Pearl PM-0305, manufactured by Ganz Chemical Co., Ltd.] (0.5 part), serving as an anti-blocking agent, was charged and mixed to obtain a resin particle composition (P-13). The volume average particle diameter of the (P-13) was 149 μm.

Example 14

Production of Resin Particle Composition (P-14)

A resin particle composition (P-14) was obtained in the same manner as in Example 13, with the exception that the compound (E-2) (2 parts) was used in place of the compound (E-1) (2 parts) in Example 13. The (P-14) had a volume average particle diameter of 149 μm.

Example 15

Production of Resin Particle Composition (P-15)

A resin particle composition (P-15) was obtained in the same manner as in Example 13, with the exception that the compound (E-3) (2 parts) was used in place of the compound (E-1) (2 parts) in Example 13. The (P-15) had a volume average particle diameter of 149 μm.

Example 16

Production of Resin Particle Composition (P-16)

A resin particle composition (P-16) was obtained in the same manner as in Example 13, with the exception that the compound (E-4) (2 parts) was used in place of the compound (E-1) (2 parts) in Example 13. The (P-16) had a volume average particle diameter of 149 μm.

Example 17

Production of Resin Particle Composition (P-17)

A resin particle composition (P-17) was obtained in the same manner as in Example 13, with the exception that the compound (E-5) (2 parts) was used in place of the compound (E-1) (2 parts) in Example 13. The (P-17) had a volume average particle diameter of 149 μm.

Example 18

Production of Resin Particle Composition (P-18)

A resin particle composition (P-18) was obtained in the same manner as in Example 13, with the exception that the compound (E-6) (2 parts) was used in place of the compound (E-1) (2 parts) in Example 13. The (P-18) had a volume average particle diameter of 149 μm.

Example 19

Production of Resin Particle Composition (P-19)

A resin particle composition (P-19) was obtained in the same manner as in Example 13, with the exception that the compound (E-7) (2 parts) was used in place of the compound (E-1) (2 parts) in Example 13. The (P-19) had a volume average particle diameter of 149 μm.

Example 20

Production of Resin Particle Composition (P-20)

A resin particle composition (P-20) was obtained in the same manner as in Example 13, with the exception that the compound (E-1) (10 parts) was used in place of the compound (E-1) (2 parts) in Example 13. The (P-20) had a volume average particle diameter of 149 μm.

Comparative Example 1

Production of Resin Particle Composition (P-1')

A resin particle composition (P-1') was obtained in the same manner as in Example 1, with the exception that the urethane resin particles (D-13) were used in place of the urethane resin particles (D-1) in Example 1. The (P-1') had a volume average particle diameter of 148 μm.

Comparative Example 2

Production of Resin Particle Composition (P-2')

Urethane resin particles (D-1') were produced in the same manner as in Example 1, with the exception that the prepolymer solution (G-1') (100 parts) and the MEK ketimine compound (5.2 parts) were used in place of the prepolymer solution (G-1) (100 parts) and the MEK ketimine compound (4.2 parts) in Example 1. The (D-1') had an Mn of 20000 and a volume average particle diameter of 145 μm.

Furthermore, a resin particle composition (P-2') was obtained in the same manner as in Example 1, with the exception that the urethane resin particles (D-1') were used in place of the urethane resin particles (D-1) in Example 1. The (P-2') had a volume average particle diameter of 148 μm.

Comparative Example 3

Production of Resin Particle Composition (P-3')

Urethane resin particles (D-2') were produced in the same manner as in Example 1, with the exception that the prepolymer solution (G-2') (100 parts) was used in place of the prepolymer solution (G-1) in Example 1. The (D-2') had an Mn of 20000 and a volume average particle diameter of 145 μm.

Furthermore, a resin particle composition (P-3') was obtained in the same manner as in Example 1, with the exception that the urethane resin particles (D-2') were used in place of the urethane resin particles (D-1) in Example 1. The (P-3') had a volume average particle diameter of 148 μm.

Comparative Example 4

Production of Resin Particle Composition (P-4')

A resin particle composition (P-4') was obtained in the same manner as in Example 13, with the exception that the compound (E-1') (2 parts) was used in place of the compound (E-1) (2 parts). The (P-4') had a volume average particle diameter of 148 μm. However, the compound (E-1') is not provided in Table 3.

Comparative Example 5

Production of Resin Particle Composition (P-5')

A resin particle composition (P-5') was obtained in the same manner as in Example 13, with the exception that the compound (E-2') (2 parts) was used in place of the compound (E-1) (2 parts). The (P-5') had a volume average particle diameter of 148 μm.

The resin particle compositions (P-1) to (P-20) of Examples 1 to 20 for slush molding and the resin particle compositions (P-1') to (P-5') of Comparative Examples 1 to 5 were used, and each was molded into skin bodies having plate thicknesses of 1.0 mm and 0.3 mm, respectively, at 210° C. in accordance with a method described below. Each composition was measured in terms of the rear-surface meltability of the skin body having a thickness of 1.0 mm, the 25° C. tensile strength thereof, the 25° C. elongation thereof, the 25° C. maximum load at break of the skin body having a thickness of 0.3 mm, as well as the 25° C. tensile strength and the elongation thereof after a heat resistance test described below.

The results are shown in Tables 1 to 3.

TABLE 1

| | | | Example 1 | Example 2 | Example 3 | Example 4 | Example 5 | Example 6 |
|---|---|---|---|---|---|---|---|---|
| Urethane resin particles (D) | | | (D-1) | (D-2) | (D-3) | (D-4) | (D-5) | (D-6) |
| Active hydrogen-containing compound (C) and structural unit (x) | Active hydrogen-containing compound (C) | | (C-1) | (C-1) | (C-1) | (C-2) | (C-2) | (C-3) |
| | $R^1$-constituting raw material | | Benzyl alcohol | Benzyl alcohol | Benzyl alcohol | Benzyl alcohol | Benzyl alcohol | — |
| | $R^2$-constituting raw material | | Ethylene glycol | Ethylene glycol | Ethylene glycol | Ethylene glycol | Ethylene glycol | Ethylene glycol |
| | Y-constituting raw material | | Trimellitic anhydride | Trimellitic anhydride | Trimellitic anhydride | Trimellitic anhydride | Trimellitic anhydride | Trimellitic anhydride |
| | The number of a | | 1 | 1 | 1 | 2 | 2 | 3 |
| | The number of b | | 2 | 2 | 2 | 1 | 1 | 0 |
| | The number of a + b | | 3 | 3 | 3 | 3 | 3 | 3 |
| Weight % of (x) in urethane or urethane-urea resin | | | 2.2 | 0.6 | 5.3 | 0.6 | 26.2 | 0.1 |
| Molecular weight of urethane resin particles (D) | | | 20,000 | 20,000 | 15,000 | 20,000 | 20,000 | 22,000 |
| Melt viscosity at 190° C. | | Pa · s | 900 | 750 | 550 | 950 | 1800 | 1000 |
| Storage modulus 'G at 130° C. | | Mpa | 0.600 | 0.450 | 0.350 | 0.700 | 1.500 | 0.650 |
| Compound (E) | Compound (E) | | — | — | — | — | — | — |
| | $R^3$-constituting raw material | | — | — | — | — | — | — |
| | V-constituting raw material | | — | — | — | — | — | — |
| | W-constituting raw material | | — | — | — | — | — | — |
| | The number of c in compound (E) | | — | — | — | — | — | — |
| | The number of m in compound (E) | | — | — | — | — | — | — |
| | Δ SP value with urethane or urethane-urea resin | | — | — | — | — | — | — |
| Weight % of compound (E) in urethane or urethane-urea resin | | | — | — | — | — | — | — |
| Thermoplastic urethane resin particle composition (P) | | | (P-1) | (P-2) | (P-3) | (P-4) | (P-5) | (P-6) |
| Melt viscosity at 190° C. | | Pa · s | 330 | 270 | 170 | 350 | 490 | 350 |
| Storage modulus 'G at 130° C. | | Mpa | 0.320 | 0.200 | 0.150 | 0.360 | 0.800 | 0.300 |
| Rear surface meltability (1.0 mm) | | Class | 5 | 5 | 5 | 5 | 4 | 5 |
| Abrasion resistance | | — | ⊙ | ○ | ○ | ○ | ⊙ | ○ |
| Tensile strength (1.0 mm) | | Mpa | 20 | 15 | 13 | 17 | 22 | 15 |
| Elongation (25° C.) | | % | 700 | 600 | 550 | 600 | 700 | 550 |
| Maximum load at break (0.3 mm) | | N | 69 | 59 | 49 | 59 | 78 | 59 |
| Tensile strength after heat resistance test (130° C. × 600 hrs) | | MPa | 12 | 8 | 7 | 10 | 15 | 9 |
| Elongation after heat resistance test (130° C. × 600 hrs) | | % | 500 | 400 | 350 | 450 | 600 | 400 |
| Thermal fusing test | | — | ○ | ○ | ○ | ○ | ○ | ○ |

TABLE 1-continued

|  |  |  | Example 7 | Example 8 | Example 9 | Example 10 |
|---|---|---|---|---|---|---|
| Urethane resin particles (D) |  |  | (D-7) | (D-8) | (D-9) | (D-10) |
| Active hydrogen-containing compound (C) and structural unit (x) | Active hydrogen-containing compound (C) |  | (C-4) | (C-5) | (C-6) | (C-7) |
|  | $R^1$-constituting raw material |  | — | Benzyl alcohol | Dodecyl alcohol | Benzyl chloride |
|  | $R^2$-constituting raw material |  | Ethylene glycol | Propylene oxide | Ethylene glycol | Ethylene glycol |
|  | Y-constituting raw material |  | Pyromellitic anhydride | Trimellitic anhydride | Trimellitic anhydride | Trimellitic anhydride |
|  | The number of a |  | 4 | 2 | 2 | 1 |
|  | The number of b |  | 0 | 1 | 1 | 2 |
|  | The number of a + b |  | 4 | 3 | 3 | 3 |
| Weight % of (x) in urethane or urethane-urea resin |  |  | 0.1 | 6 | 5.9 | 1.1 |
| Molecular weight of urethane resin particles (D) |  |  | 26,000 | 20,000 | 20,000 | 20,000 |
| Melt viscosity at 190° C. |  | Pa · s | 1300 | 1200 | 800 | 400 |
| Storage modulus 'G at 130° C. |  | Mpa | 1.000 | 0.800 | 0.550 | 0.500 |
| Compound (E) | Compound (E) |  | — | — | — | — |
|  | $R^3$-constituting raw material |  | — | — | — | — |
|  | V-constituting raw material |  | — | — | — | — |
|  | W-constituting raw material |  | — | — | — | — |
|  | The number of c in compound (E) |  | — | — | — | — |
|  | The number of m in compound (E) |  | — | — | — | — |
|  | Δ SP value with urethane or urethane-urea resin |  | — | — | — | — |
| Weight % of compound (E) in urethane or urethane-urea resin |  |  | — | — | — | — |
| Thermoplastic urethane resin particle composition (P) |  |  | (P-7) | (P-8) | (P-9) | (P-10) |
| Melt viscosity at 190° C. |  | Pa · s | 460 | 370 | 300 | 150 |
| Storage modulus 'G at 130° C. |  | Mpa | 0.500 | 0.380 | 0.270 | 0.160 |
| Rear surface meltability (1.0 mm) |  | Class | 4 | 5 | 5 | 5 |
| Abrasion resistance |  |  | — | ⊙ | ⊙ | ⊙ |
| Tensile strength (1.0 mm) |  | Mpa | 20 | 20 | 17 | 22 |
| Elongation (25° C.) |  | % | 500 | 700 | 650 | 550 |
| Maximum load at break (0.3 mm) |  | N | 69 | 69 | 59 | 78 |
| Tensile strength after heat resistance test (130° C. × 600 hrs) |  | MPa | 15 | 12 | 9 | 14 |
| Elongation after heat resistance test (130° C. × 600 hrs) |  | % | 62.1 | 500 | 450 | 500 |
| Thermal fusing test |  |  | — | ○ | ○ | ○ | ○ |

TABLE 2

|  |  | Example 11 | Example 12 | Example 13 | Example 14 | Example 15 | Example 16 |
|---|---|---|---|---|---|---|---|
| Urethane resin particles (D) |  | (D-11) | (D-12) | (D-13) | (D-13) | (D-13) | (D-13) |
| Active hydrogen-containing compound (C) and structural unit (x) | Active hydrogen-containing compound (C) | (C-7) | (C-8) | — | — | — | — |
|  | $R^1$-constituting raw material | Benzyl chloride | Benzyl alcohol | — | — | — | — |
|  | $R^2$-constituting raw material | Ethylene glycol | Ethylene diamine | — | — | — | — |
|  | Y-constituting raw material | Trimellitic anhydride | Trimellitic anhydride | — | — | — | — |
|  | The number of a | 1 | 1 | — | — | — | — |
|  | The number of b | 2 | 2 | — | — | — | — |
|  | The number of a + b | 3 | 3 | — | — | — | — |
| Weight % of (x) in urethane or urethane-urea resin |  | 5.5 | 1.1 | 0 | 0 | 0 | 0 |
| Molecular weight of urethane resin particles (D) |  | 20,000 | 20,000 | 20,000 | 20,000 | 20,000 | 20,000 |
| Melt viscosity at 190° C. Pa · s |  | 600 | 1200 | 500 | 500 | 500 | 500 |
| Storage modulus 'G at 130° C. Mpa |  | 0.700 | 1.500 | 0.120 | 0.120 | 0.120 | 0.120 |
| Compound (E) | Compound (E) | — | — | (E-1) | (E-2) | (E-3) | (E-4) |
|  | $R^3$-constituting raw material | — | — | Benzyl alcohol | Benzyl alcohol | Benzyl alcohol | Benzylamine |
|  | V-constituting raw material | — | — | Trimellitic anhydride | Trimellitic anhydride | Pyromellitic anhydride | Trimellitic anhydride |
|  | W-constituting raw material | — | — | 1,10-Decanediol | Ethylene glycol | 1,10-Decanediol | 1,10-Decanediol |

TABLE 2-continued

| | | | | | | | |
|---|---|---|---|---|---|---|---|
| | The number of c in compound (E) | — | — | 2 | 2 | 3 | 2 |
| | The number of m in compound (E) | — | — | 2 | 2 | 2 | 2 |
| | Δ SP value with urethane or urethane-urea resin | — | — | 0.2 | 0.4 | 0.1 | 1.3 |
| Weight % of compound (E) in urethane or urethane-urea resin | | — | — | 2 | 2 | 2 | 2 |
| Thermoplastic urethane resin particle composition (P) | | (P-11) | (P-12) | (P-13) | (P-14) | (P-15) | (P-16) |
| Melt viscosity at 190° C. | Pa·s | 220 | 420 | 260 | 300 | 210 | 240 |
| Storage modulus 'G at 130° C. | Mpa | 0.300 | 0.900 | 0.220 | 0.250 | 0.160 | 0.200 |
| Rear surface meltability (1.0 mm) | Class | 5 | 4 | 5 | 5 | 5 | 5 |
| Abrasion resistance | — | ⊙ | ⊙ | ⊙ | ⊙ | ⊙ | ⊙ |
| Tensile strength (1.0 mm) | Mpa | 20 | 18 | 22 | 21 | 19 | 18 |
| Elongation (25° C.) | % | 500 | 550 | 650 | 660 | 600 | 580 |
| Maximum load at break (0.3 mm) | N | 78 | 49 | 69 | 69 | 59 | 49 |
| Tensile strength after heat resistance test (130° C. × 600 hrs) | MPa | 11 | 10 | 10 | 9 | 8 | 8 |
| Elongation after heat resistance test (130° C. × 600 hrs) | % | 400 | 450 | 450 | 400 | 400 | 350 |
| Thermal fusing test | — | ○ | ○ | ○ | ○ | ○ | ○ |

| | | | Example 17 | Example 18 | Example 19 | Example 20 |
|---|---|---|---|---|---|---|
| | Urethane resin particles (D) | | (D-13) | (D-13) | (D-13) | (D-13) |
| Active hydrogen-containing compound (C) and structural unit (x) | Active hydrogen-containing compound (C) | | — | — | — | — |
| | $R^1$-constituting raw material | | — | — | — | — |
| | $R^2$-constituting raw material | | — | — | — | — |
| | Y-constituting raw material | | — | — | — | — |
| | The number of a | | — | — | — | — |
| | The number of b | | — | — | — | — |
| | The number of a + b | | — | — | — | — |
| Weight % of (x) in urethane or urethane-urea resin | | | 0 | 0 | 0 | 0 |
| Molecular weight of urethane resin particles (D) | | | 20,000 | 20,000 | 20,000 | 20,000 |
| Melt viscosity at 190° C. | Pas | | 500 | 500 | 500 | 500 |
| Storage modulus 'G at 130° C. | Mpa | | 0.120 | 0.120 | 0.120 | 0.120 |
| Compound (E) | Compound (E) | | (E-5) | (E-6) | (E-7) | (E-1) |
| | $R^3$-constituting raw material | | Benzyl alcohol | Benzyl alcohol | Benzyl alcohol | Benzyl alcohol |
| | V-constituting raw material | | Trimellitic anhydride | Trimellitic anhydride | Trimellitic anhydride | Trimellitic anhydride |
| | W-constituting raw material | | Glycerol | Pentaerythritol | Sucrose | 1,10-Decanediol |
| | The number of c in compound (E) | | 2 | 2 | 2 | 2 |
| | The number of m in compound (E) | | 3 | 4 | 8 | 2 |
| | Δ SP value with urethane or urethane-urea resin | | 0.5 | 0.5 | 0.6 | 0.2 |
| Weight % of compound (E) in urethane or urethane-urea resin | | | 2 | 2 | 2 | 10 |
| Thermoplastic urethane resin particle composition (P) | | | (P-17) | (P-18) | (P-19) | (P-20) |
| Melt viscosity at 190° C. | Pa·s | | 180 | 130 | 210 | 240 |
| Storage modulus 'G at 130° C. | Mpa | | 0.120 | 0.100 | 0.150 | 0.200 |
| Rear surface meltability (1.0 mm) | Class | | 5 | 5 | 5 | 5 |
| Abrasion resistance | — | | ⊙ | ⊙ | ⊙ | ⊙ |
| Tensile strength (1.0 mm) | Mpa | | 19 | 16 | 18 | 21 |
| Elongation (25° C.) | % | | 630 | 640 | 600 | 700 |
| Maximum load at break (0.3 mm) | N | | 69 | 49 | 59 | 59 |
| Tensile strength after heat resistance test (130° C. × 600 hrs) | MPa | | 9 | 7 | 8 | 9 |
| Elongation after heat resistance test (130° C. × 600 hrs) | % | | 400 | 400 | 350 | 450 |
| Thermal fusing test | — | | ○ | ○ | ○ | ○ |

TABLE 3

| | | Comparative Example 1 | Comparative Example 2 | Comparative Example 3 | Comparative Example 4 | Comparative Example 5 |
|---|---|---|---|---|---|---|
| Urethane resin particles (D) | | (D-13) | (D-1') | (D-2') | (D-13) | (D-13) |
| Active hydrogen-containing compound (C) | Active hydrogen-containing compound (C) | — | — | — | — | — |
| | $R^1$-constituting raw material | — | — | — | — | — |
| | $R^2$-constituting raw material | — | — | — | — | — |
| | Y-constituting raw material | — | — | — | — | — |

TABLE 3-continued

| | | Comparative Example 1 | Comparative Example 2 | Comparative Example 3 | Comparative Example 4 | Comparative Example 5 |
|---|---|---|---|---|---|---|
| structural unit (x) | The number of a | — | — | — | — | — |
| | The number of b | — | — | — | — | — |
| | The number of a + b | — | — | — | — | — |
| Weight % of (x) in urethane or urethane-urea resin | | 0 | 0 | 0 | 0 | 0 |
| Molecular weight of urethane resin particles (D) | | 20,000 | 20,000 | 20,000 | 20,000 | 20,000 |
| Melt viscosity at 190° C. | Pa·s | 500 | 1500 | 500 | 500 | 500 |
| Storage modulus 'G at 130° C. | MPa | 0.120 | 2.200 | 0.110 | 0.120 | 0.120 |
| Compound (E) | Compound (E) | — | — | — | — | — |
| | R³-constituting raw material | — | — | — | — | — |
| | V-constituting raw material | — | — | — | — | — |
| | W-constituting raw material | — | — | — | — | — |
| | The number of c in compound (E) | — | — | — | — | — |
| | The number of m in compound (E) | — | — | — | — | — |
| | Δ SP value with urethane or urethane-urea resin | — | — | — | — | — |
| Weight % of compound (E) in urethane or urethane-urea resin | | | | | | |
| Thermoplastic urethane resin particle composition (P) | | (P-1') | (P-2') | (P-3') | (P-4') | (P-5') |
| Melt viscosity at 190° C. | Pa·s | 120 | 600 | 100 | 100 | 110 |
| Storage modulus 'G at 130° C. | MPa | 0.080 | 1.200 | 0.078 | 0.065 | 0.070 |
| Rear surface meltability (1.0 mm) | Class | 5 | 3 | 5 | 5 | 5 |
| Abrasion resistance | — | Δ | Δ | Δ | X | X |
| Tensile strength (1.0 mm) | MPa | 8 | 5 | 7 | 7 | 6 |
| Elongation (25° C.) | % | 500 | 350 | 550 | 500 | 400 |
| Maximum load at break (0.3 mm) | N | 29 | 9.8 | 29 | 20 | 20 |
| Tensile strength after heat resistance test (130° C. × 600 hrs) | MPa | 2 | 1 | 2 | 1 | 2 |
| Elongation after heat resistance test (130° C. × 600 hrs) | % | 200 | 120 | 220 | 130 | 200 |
| Thermal fusing test | — | X | ○ | X | X | X |

Figure 2:
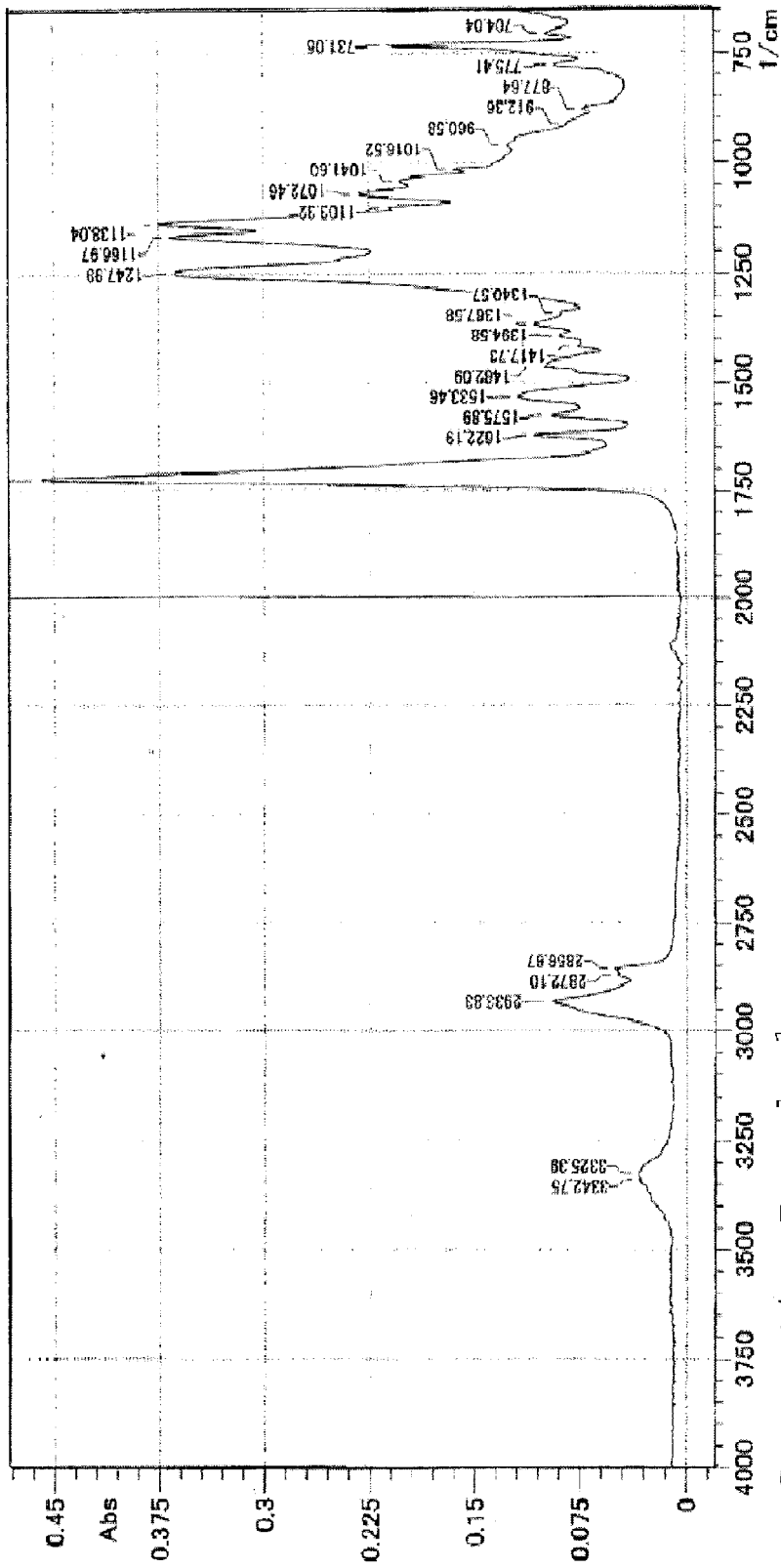
FIG. 2 is a measurement result of infrared absorption spectrum (Comparative Example 1).

In order to confirm hydrogen bonds between the urethane or urea groups (u) of the urethane or urethane-urea resin (U1) and the residues (j) derived from a tri- or more valent aromatic polycarboxylic acid by removing hydroxyl groups, the IR spectrum of the resin particle composition (P-10) of Example 10 was measured, and as a result, absorption was recognized at 1686 cm$^{-1}$ as shown in FIG. 1. Further, the IR spectrum of the resin particle composition (P-1') of Comparative Example 1 in which no hydrogen bond between the (u) and the (j) was present was measured, and as a result, no absorption was recognized near 1680 to 1720 cm$^{-1}$ as shown in FIG. 2.

<Preparation of Skin Body>

In order to perform low-temperature molding, the resin particle compositions (P-1) to (P-20) and (P-1') to (P-5') for slush molding were each filled into a Ni-electrocast mold which was a mold having a grain pattern and had been heated beforehand to 210° C. After 10 seconds, an extra amount of the resin particle composition was discharged therefrom. After 60 seconds, cooling was performed with water to prepare a skin body (thickness: 1 mm). Skin bodies having a thickness of 0.3 mm were each prepared in the same manner as in the above-described method except that the period after the filling was changed to 5 seconds.

<Method for Measuring Melt Viscosity at 190° C.>

A flow tester, CFT-500, manufactured by SHIMADZU CORPORATION was used to raise the temperature of each of the measurement samples at a constant rate under the conditions below, and the melt viscosity at 190° C. thereof was measured.

Load: 5 kgf
Die: hole diameter: 0.5 mm, length: 1.0 mm
Temperature-raising rate: 5° C./minute <Method for Measuring Storage Modulus at 130° C.>

A dynamic viscoelastometer, "RDS-2", manufactured by Rheometric Scientific Inc. was used to measure the storage modulus G' at 130° C. of each of the measurement samples under a condition of 1 Hz frequency.

The measurement sample was set to a jig of the meter, and then the temperature was raised to 200° C. At 200° C., the sample was allowed to stand still inside the jig for 1 minute to be melted. The sample was then cooled to be solidified, and allowed to adhere closely to the jig.

Thereafter, the sample was measured. The range of temperatures for the measurement was 50 to 200° C. The melt viscoelasticity between these temperatures is measured, so that a temperature-G' curve and a temperature-G" curve are given.

The storage modulus G' at 130° C. is read out from the temperature-G' curve.

Jig diameter: 8 mm

<Method for Measuring Number Average Molecular Weight (Mn)>

The number average molecular weight (Mn) of each resin was measured under the conditions below by gel permeation chromatography (GPC).

Device: "HLC-8120" [manufactured by Tosoh Corporation]
Column: "TSK GEL GMH6" 2 columns [manufactured by Tosoh Corporation]
Measurement temperature: 40° C.
Sample solution: 0.25% by weight THF (tetrahydrofuran) solution
Solution injection amount: 100 μl
Detection device: refractive index detector
Reference substance: standard polystyrene (TSKstandard POLYSTYRENE) 12 points (molecular weight 500, 1,050, 2,800, 5,970, 9,100, 18,100, 37,900, 96,400, 190,000, 355,000, 1,090,000, 2,890,000) [manufactured by Tosoh Corporation]

For the measurement of molecular weight, the samples were each dissolved in THF, the insoluble matter was filtered out with a glass filter, and the resultant was used as a sample solution.

<Method for Measuring Volume-Average Particle Diameter>

The particle diameter at which 50% particles passed through a sieve measured by a laser light scattering method was measured by using a Microtrack HRA particle size analyzer 9320-X100 (manufactured by NIKKISO CO., LTD.).

<Rear Surface Meltability>

For the skin bodies having a thickness of 1 mm, the central region of the rear surface of each of the molded skin bodies was observed visually. The meltability was evaluated in accordance with the decision criteria below.

5: The rear surface is uniform and glossy.
4: The rear surface partially has the powder not melted, but is glossy.
3: The whole of the rear surface has irregularities, and is not glossy. The surface has no pinhole penetrating to the front surface.
2: The whole of the rear surface has irregularities in the form of powder, and further has one or more pinholes penetrating to the front surface.
1: The powder is not melted, so that a molded product is not obtained.

<Abrasion Resistance>

The molded skin bodies having a plate thickness of 1 mm were each cut into a size of 30 mm in width and 200 mm in length, the cut skin body is mounted on a flat surface abrasion tester (model FR-T, Suga Test Instruments, Co., Ltd.), and fixed by covering white cotton on the friction element. The test piece was reciprocated 3000 times with the load of the friction element being set to 0.5 kgf, so that the abrasion resistance test was performed.

The abrasion resistance was evaluated in accordance with the criteria below.

⊚: No abnormality is recognized.
○: Abnormality is slightly recognized, but not obvious.
Δ: Abnormality is recognized and clearly seen.
×: Abnormality is significantly recognized.

<Methods for Measuring Tensile Strength, Elongation, and Maximum Load at Break>

Three tensile test pieces each having a dumbbell shape No. 1 according to JIS K 6400-5 were cut out from each of the molded skin bodies having a thickness of 1 mm. At the center of each of the test pieces, lines were marked at intervals of 40 mm. As the plate thickness of the piece, the minimum value from the respective thicknesses at 5 points that were each between the marked lines was adopted. This piece was mounted on an autograph under an atmosphere of 25° C., and then pulled at a rate of 200 mm/minute. The tensile strength and the elongation until the test piece was broken were calculated.

In addition, skin bodies having a thickness of 0.3 mm were each subjected to the same measurement, and the maximum load at break until the above-described test piece was broken was calculated.

<Methods for Measuring Tensile Strength and Elongation at 25° C. after Heat Resistance Test>

The molded skin bodies having a thickness of 1 mm were each allowed to stand still in a wind-circulating drier at 130° C. for 600 hours. Subsequently, the treated skin body was allowed to stand still at 25° C. for 24 hours. Subsequently, three tensile test pieces each having a dumbbell shape No. 1 according to JIS K 6400-5 were cut out therefrom. At the center of each of the test pieces, lines were marked at intervals of 40 mm. As the plate thickness of the piece, the minimum value from the respective thicknesses at 5 points that were each between the marked lines was adopted. This piece was mounted on an autograph under an atmosphere of 25° C., and then pulled at a rate of 200 mm/minute. The tensile strength and the elongation until the test piece was broken were calculated.

<Thermal Fusing Test>

The molded skin bodies having a thickness of 1 mm were each cut into a size of 60 mm in vertical length and 95 mm in horizontal length. On the rear surface of the sheet, a slit of 0.4 to 0.6 mm in depth and 60 mm in length was made in an almost perpendicular direction to the surface by a cold cutter (thickness of the blade was 0.3 mm). The molded skin body was sandwiched between two sheets of releasing paper, and an iron plate having a weight of 95 to 100 g and a dimension (vertical length, horizontal length, and height) of 100 mm vertical length×100 mm horizontal length×1.2 mm thickness was mounted on the releasing paper so as to hide the releasing paper. The molded skin body was allowed to stand still in the air under the normal pressure at 130° C. for 100 hours. Then, whether the slit of the above-described sheet was fused or not was observed visually.

The fusing was evaluated in accordance with the criteria below.

○: The slit by the cutter is not fused at all.
×: The slit by the cutter is fused.

The resin particle compositions (P-1) to (P-20) of Examples 1 to 20 for slush molding are excellent in abrasion resistance, tensile strength at 25° C., maximum load at break, tensile strength at 25° C. after heat resistance test, and elongation at 25° C. after heat resistance test as compared with the resin particle compositions (P-1') to (P-5') of Comparative Examples 1 to 5.

Moreover, the (P-1) to (P-20) are equal to or excellent in rear surface meltability, thermal fusing test, and elongation at 25° C. as compared with the (P-1') to (P-5').

Further, the maximum loads at break of 0.3 mm of the (P-1) to (P-20) are excellent as compared with those of the (P-1') to (P-5'), so that the molded skin bodies can each be made into a thinner form.

Accordingly, the resin particle compositions (P-1) to (P-20) of Examples 1 to 20 for slush molding are excellent in all three properties: meltability of the (P) and heat resistance and mechanical properties of a molded body of the (P), so that they are excellent, in particular, as a material for an instrument panel.

INDUSTRIAL APPLICABILITY

A molded body molded from the thermoplastic urethane resin particle composition of the present invention, for example, a skin body thereof, is suitably used as an automobile interior material, for example, an instrument panel, a door trim, or the like.

The invention claimed is:
1. Urethane resin particles (D) which are either of urethane resin particles (D1) or urethane resin particles (D2):
the urethane resin particles (D1) comprising a urethane or urethane-urea resin (U1) having a structural unit (x) represented by general formula (2):

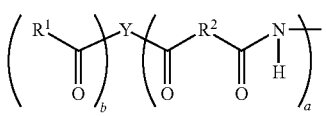

wherein the urethane or urethane-urea resin (U1) is a polyurethane resin obtained by reacting an active hydrogen component (A) with an isocyanate component (B), the active hydrogen component (A) containing an active hydrogen-containing compound (C) represented by general formula (3):

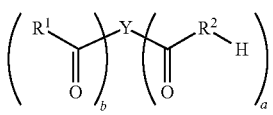

wherein in the general formula (2) and the general formula (3), $R^1$ is represented by general formula (5):

$$—O—CH_2—R^5 \quad (5)$$

wherein $R^5$ represents a monovalent hydrocarbon group having a carbon number of 1 to 28; $R^2$ is a residue derived from a divalent active hydrogen-containing compound by removing two active hydrogens, and a plurality of $R^2$ may be the same or different from each other; Y is a residue derived from a tri- or more valent aromatic polycarboxylic acid by removing all carboxyl groups; and a and b are each an integer satisfying $1 \leq a \leq$ (the number of substituents capable of being directly linked to the aromatic ring$-b$), $1 \leq b \leq$ (the number of substituents capable of being directly linked to the aromatic ring$-a$), and $3 \leq a+b \leq 8$, or the urethane resin particles (D2) comprising a urethane resin composition (S2) which comprises both a urethane or urethane-urea resin (U2) and a compound (E), the compound (E) being represented by general formula (1);

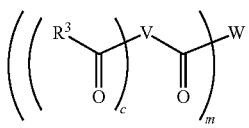

wherein in the general formula (1), $R^3$ represents a residue derived from a monovalent or polyvalent active hydrogen-containing compound by removing one active hydrogen, or an OH group, and a plurality of $R^3$ may be the same or different from each other; V represents a residue derived from a tri- or more valent aromatic polycarboxylic acid by removing all carboxyl groups, and in the aromatic ring of V, a hydrogen atom is bonded to at least one ring carbon; c is an integer satisfying $2 \leq c \leq$ (the number of substituents capable of being directly linked to the aromatic ring$-2$); W represents a residue derived from an m- or more valent active hydrogen-containing compound by removing m active hydrogens; and m is an integer of 2 to 10.

2. The urethane resin particles (D) according to claim 1, wherein the urethane or urethane-urea resin (U1) and the urethane or urethane-urea resin (U2) are thermoplastic resins.

3. The urethane resin particles (D) according to claim 1, wherein in the urethane or urethane-urea resin (U1), the aromatic polycarboxylic acid is a benzene polycarboxylic acid when the number of carboxyl groups is 3, the substitution positions of the carboxyl groups are at 1, 2, 4-position, and when the number of carboxyl groups is 4, the substitution positions of the carboxyl groups are at 1, 2, 4, 5-position or 1, 2, 3, 4-position.

4. The urethane resin particles (D) according to claim 1, wherein in the general formula (2) or (3), $R^2$ is represented by general formula (4):

$$—O—R^4—O— \quad (4)$$

wherein $R^4$ represents a divalent aliphatic hydrocarbon group having a carbon number of 2 to 10.

5. The urethane resin particles (D) according to claim 4, wherein in the general formula (4), $R^4$ is an ethylene group.

6. The urethane resin particles (D) according to claim 1, wherein in the general formula (5), $R^5$ is a phenyl group.

7. The urethane resin particles (D) according to claim 1, wherein the urethane or urethane-urea resin (U1) contains the structural unit (x) represented by the general formula (2) in an amount of 0.1 to 30% by weight based on the weight of the (U1).

8. The urethane resin particles (D) according to claim 1, wherein in the general formula (2) or (3), a is 1 or 2.

9. The urethane resin particles (D) according to claim 1, wherein in the compound (E), the aromatic polycarboxylic acid is a benzene polycarboxylic acid, and when the number of carboxyl groups is 3, the substitution positions of the carboxyl groups are at 1, 2, 4-position, and when the number of carboxyl groups is 4, the substitution positions of the carboxyl groups are at 1, 2, 4, 5-position or 1, 2, 3, 4-position.

10. The urethane resin particles (D) according to claim 1, wherein the compound (E) is contained in an amount of 0.1 to 10% by weight based on the weight of the urethane or urethane-urea resin (U2).

11. The urethane resin particles (D) according to claim 1, wherein a difference of solubility parameter ($\Delta$ SP value) between the compound (E) and the urethane or urethane-urea resin (U2) is 0 to 1.5.

12. A thermoplastic urethane resin particle composition (P) for slush molding, comprising the urethane resin particles (D) according to claim 1 and an additive (F) which is at least one kind selected from an inorganic filler, a pigment, a plasticizer, a releasing agent, a blocking inhibitor, and a stabilizer.

* * * * *